United States Patent
Jurkovic et al.

(10) Patent No.: US 9,931,769 B2
(45) Date of Patent: Apr. 3, 2018

(54) AUTOMATED RUBBER MOLDING AND DE-MOLDING

(71) Applicant: NIKE, Inc., Beaverton, OR (US)

(72) Inventors: Dragan Jurkovic, Taichung (TW);
Patrick Conall Regan, Taichung (TW);
I-Huang Liu, Taichung (TW);
Feng-Ming Ou, Taichung (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/636,048

(22) Filed: Jun. 28, 2017

(65) Prior Publication Data

US 2017/0297236 A1    Oct. 19, 2017

Related U.S. Application Data

(63) Continuation of application No. 15/398,488, filed on Jan. 4, 2017, now Pat. No. 9,724,851, which is a
(Continued)

(51) Int. Cl.
| | |
|---|---|
| *B29C 43/50* | (2006.01) |
| *B29D 35/00* | (2010.01) |
| *B29C 37/02* | (2006.01) |
| *B29D 35/12* | (2010.01) |
| *B29K 21/00* | (2006.01) |

(52) U.S. Cl.
CPC .............. *B29C 43/50* (2013.01); *B29C 37/02* (2013.01); *B29D 35/0063* (2013.01); *B29D 35/122* (2013.01); *B29D 35/128* (2013.01); *B29C 2043/5069* (2013.01); *B29K 2021/00* (2013.01)

(58) Field of Classification Search
CPC .................................................. B29C 37/0007
See application file for complete search history.

(56) References Cited

U.S. PATENT DOCUMENTS

| | | | |
|---|---|---|---|
| 3,563,302 A | 2/1971 | Thevenin | |
| 3,727,677 A | 4/1973 | Thomas | |
| (Continued) | | | |

FOREIGN PATENT DOCUMENTS

| | | |
|---|---|---|
| CN | 2260696 Y | 8/1997 |
| CN | 2365042 Y | 2/2000 |
| CN | 2912910 Y | 6/2007 |
| CN | 201736221 U | 2/2011 |
| CN | 201950758 U | 8/2011 |
| CN | 204263521 U | 4/2015 |
| DE | 2336957 A1 | 2/1975 |
| EP | 1508419 A1 | 2/2005 |
| GB | 1272571 A | 5/1972 |
| (Continued) | | |

OTHER PUBLICATIONS

Notice of Allowance dated Jun. 28, 2017 in U.S. Appl. No. 15/398,488, 2 pages.

*Primary Examiner* — Ryan Ochylski
(74) *Attorney, Agent, or Firm* — Shook, Hardy & Bacon, L.L.P.

(57) ABSTRACT

Molded rubber objects may be molded and de-molded by defining both a desired final form for the molded rubber object and a tab extending from the final form of the molded rubber object using a cavity in a mold. Rubber pellets may be dispensed in predetermined amounts at desired location(s) within the cavity to provide the rubber needed to form the molded rubber object. Heat and pressure may be applied to the mold to cause the rubber pellets to fill the cavity defining both the desired final form of the molded rubber object and the tab. After the heat and pressure has been applied, a gripping device may grasp the tab and move the tab in a direction and with sufficient force to peel the rubber object from the mold cavity. If desired, the tab may be removed from the molded rubber object.

20 Claims, 32 Drawing Sheets

Related U.S. Application Data continuation of application No. 14/067,260, filed on Oct. 30, 2013, now Pat. No. 9,566,724.

(56) References Cited

U.S. PATENT DOCUMENTS

| | | |
|---|---|---|
| 3,855,657 A | 12/1974 | Mazzotta et al. |
| 3,865,667 A | 2/1975 | Ferrari |
| 3,923,095 A | 12/1975 | Jorgensen |
| 4,076,483 A | 2/1978 | Smirne |
| 4,249,882 A | 2/1981 | Koch et al. |
| 4,359,083 A | 11/1982 | Jacobsen |
| 4,368,018 A | 1/1983 | Rees et al. |
| 5,111,921 A | 5/1992 | Marks et al. |
| 5,527,174 A | 6/1996 | Godin et al. |
| 6,390,174 B1 | 5/2002 | Bloch et al. |
| 7,216,691 B2 | 5/2007 | Grassi et al. |
| 9,724,851 B2 | 8/2017 | Jurkovic et al. |
| 2004/0197432 A1 | 10/2004 | Menard |
| 2005/0040552 A1 | 2/2005 | Gemberling |
| 2006/0186534 A1 | 8/2006 | Maeda et al. |
| 2011/0101568 A1 | 5/2011 | Gallego et al. |

FOREIGN PATENT DOCUMENTS

| | | |
|---|---|---|
| JP | H05111921 | 5/1993 |
| WO | 2008057077 A1 | 5/2008 |
| WO | 2010002390 A1 | 1/2010 |
| WO | 2011014902 A1 | 2/2011 |
| WO | 2013136313 A1 | 9/2013 |
| WO | 2014120213 A1 | 8/2014 |

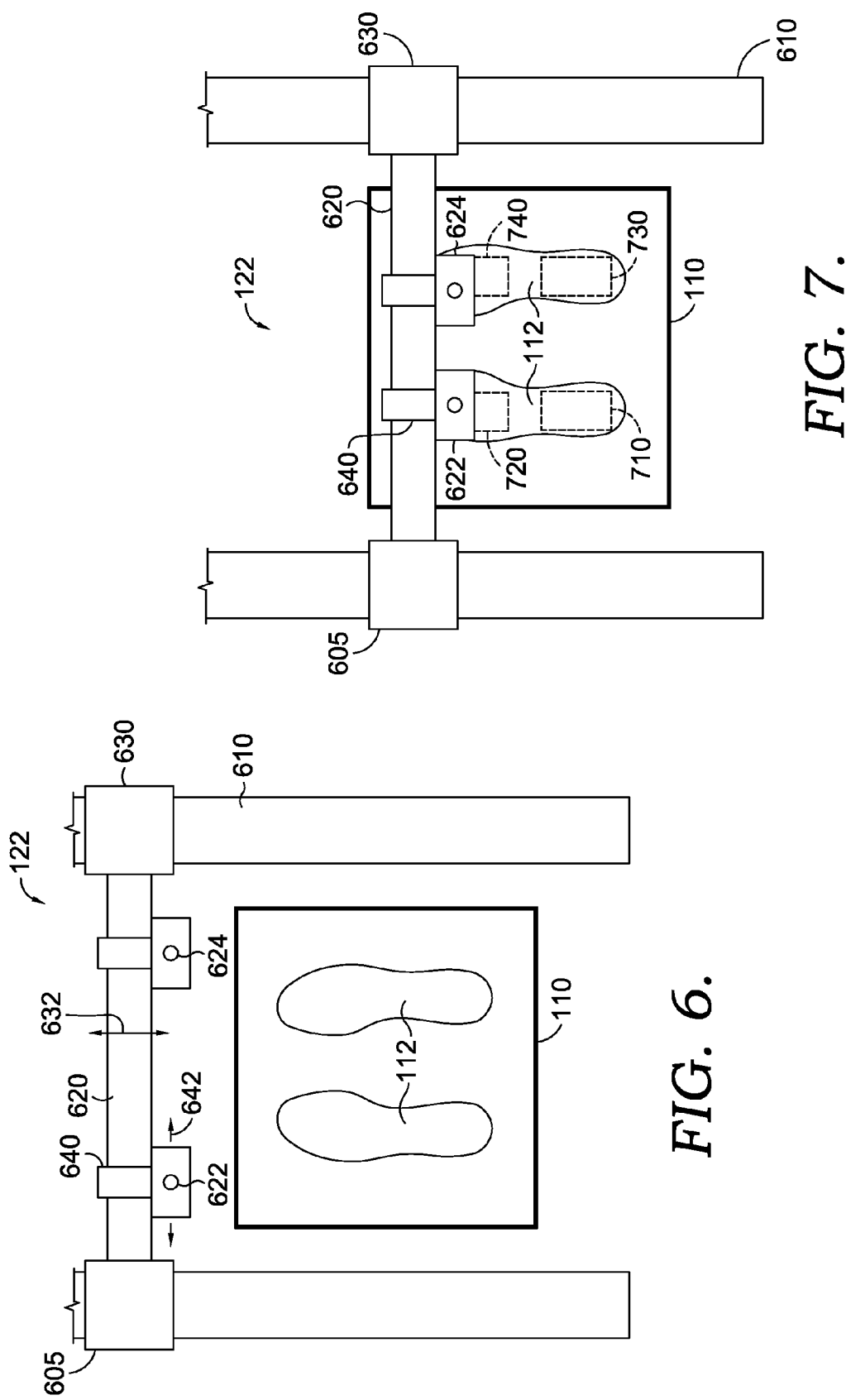

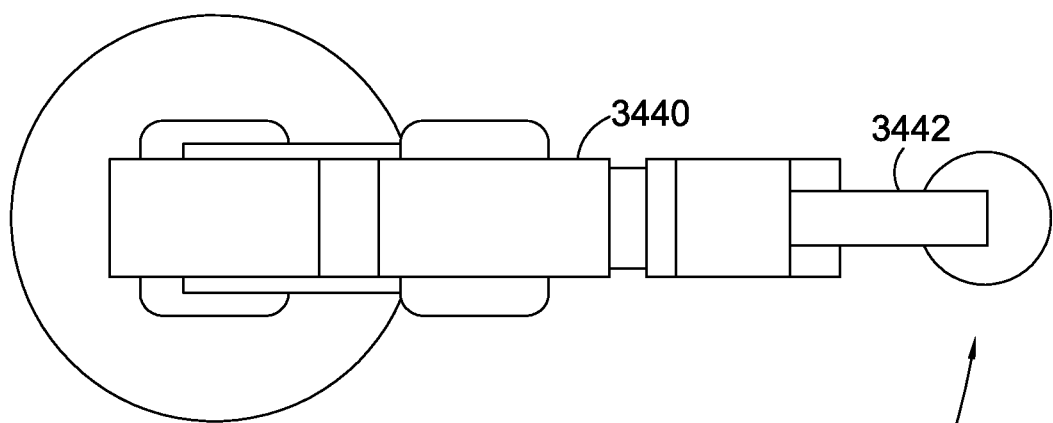
FIG. 49.
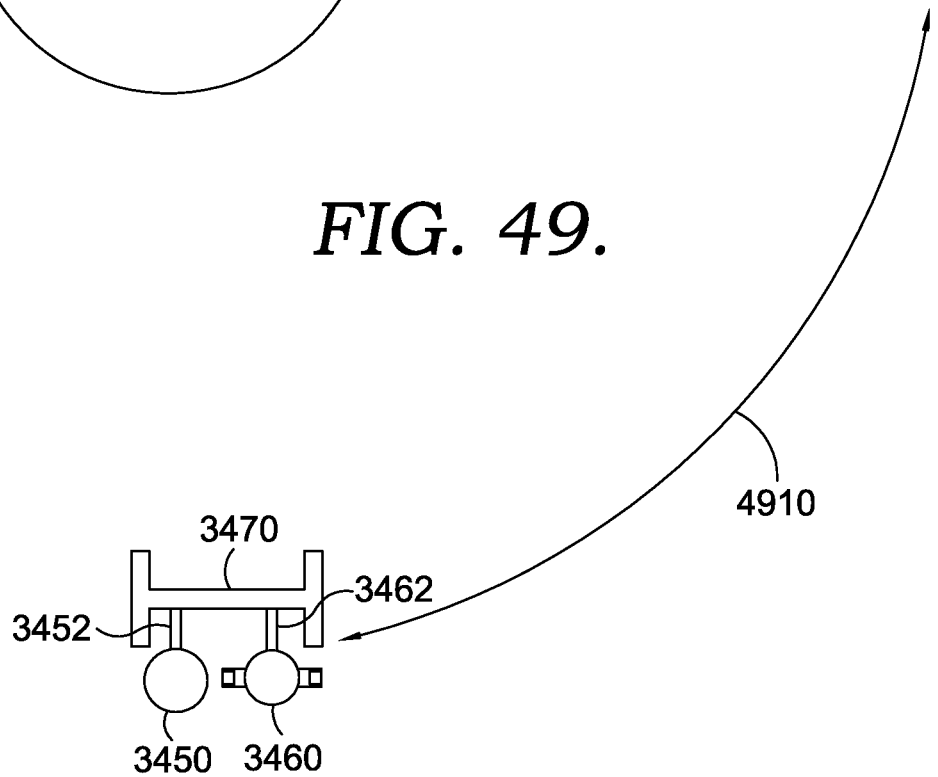

US 9,931,769 B2

AUTOMATED RUBBER MOLDING AND DE-MOLDING

CROSS-REFERENCE TO RELATED APPLICATIONS

This application is a continuation of, and claims priority to, pending U.S. Nonprovisional application Ser. No. 15/398,488, filed Jan. 4, 2017, which is a continuation of U.S. Nonprovisional application Ser. No. 14/067,260, filed Oct. 30, 2013. The disclosures of all of these applications are hereby incorporated by reference in their entirety for any and all purposes.

TECHNICAL FIELD

The present invention relates to the processing of rubber. More particularly, the present application relates to systems and methods for the automated molding and de-molding of rubber parts, particularly parts for use in shoe production.

BACKGROUND

The rubber used to form shoe parts, such as shoe outsoles, has traditionally been prepared from sheets of rubber cut to an approximate size and shape and then molded to cure the rubber part into something close to its final desired form.

SUMMARY

Aspects of the present invention provide systems and methods for the automated fabrication of rubber components for products such as shoes. In systems and methods in accordance with aspects of the present invention, a mold may be provided having a cavity therein that defines the approximate desired final form of the desired rubber part, such as the rubber part's desired shape and size, as well as any textures, contours, or other surface variations desired in the final rubber part. The cavity may further define at least one tab extending from the desired final form of the rubber part. Such a tab may extend from any portion of the cavity that defines the desired final form of the molded part, and thereby create a tab extending from the resulting molded rubber object at any portion. The cavity and/or tab may be formed in one or more portions of a mold, for example in the mold bottom, in a mold top, in both the top and bottom of a mold, in intermediate layers of a mold, lateral portion(s) of a mold, etc. A tab may extend in a variety of angles, orientations, etc. relative to the cavity defining the desired rubber part and/or the mold defining the cavity. For example, a rubber part formed in accordance with aspects of the present invention may extend in a substantially planar co-planar fashion, at an acute angle, at a perpendicular angle, or at an obtuse angle relative to the substantially planar part. In particular examples, the cavity may define a desired final form having an elongated shape and the at least one tab may be positioned at or near one end of the elongated form. For example, an elongated form for a rubber molded object may be useful for creating a rubber part such as a shoe outsole.

Regardless as to the shape of the final form of the rubber object defined by the cavity, a tab may extend from a portion of the mold where two mold portions are contact each other in the molding process, which often correspond to a portion of the molded rubber object with "flash" i.e., excess rubber attached to the rubber object that forms between adjacent portions of a mold during the application of heat and/or pressure in the molding process. By locating a tab in a portion of the part that is likely to have flash associated with it, the tab may be removed from the molded rubber part at the same time and in the same manner in which the part is de-flashed.

The cavity that defines the final form of the desired part and at least one tab extending from the final form of the desired part may be accessible by removing a mold top from mold bottom. The mold top, the mold bottom, and any further portions of a mold, may be partially or entirely separable to permit access to the cavity. For example, a hinge or other movable connection between a mold top and bottom may be provided to permit the mold to be partially separated to permit access to the cavity defining the desired rubber part.

A dispenser may dispense rubber pellets within the cavity of the mold. The dispenser may be movably positioned at a first position corresponding to a first location within the cavity. At the first location, the dispenser may dispense a predetermined amount of rubber pellets into the cavity. Thereafter, the dispenser may optionally be moved to a second position corresponding to a second location within the cavity. At the second position, the dispenser may dispense a second predetermined amount of rubber pellets. The dispensing of rubber pellets optionally may be repeated at any number of locations within one or more cavities contained within a mold in accordance with aspects of the present invention. The amount of rubber pellets dispensed at a first location, a second location, or any other locations within one or more cavities in accordance with aspects of the present invention may be the same or different at the various locations. Different amounts of rubber pellets may be desired at different locations within a cavity due to the shape of a rubber object requiring differing volumes of rubber for different portions of a rubber object. For example, a forefoot portion of a shoe outsole may require more rubber than a heel portion of a shoe outsole and, therefore, a larger amount of rubber may be dispensed at the forefoot location than the heel location of a cavity. The predetermined amount of rubber pellets dispensed at any given location may be determined by weight, volume, the time devoted to dispensing, or any other means. In one aspect, it can be preferable to dispense pellets according to their weight. A dispenser may be positioned using an X-Y table, a six-axis robotic arm, or any other mechanism.

After all desired rubber pellets have been dispensed at the appropriate locations within one or more cavities of a mold, the mold may be closed. Heat and/or pressure may be applied to the mold to cause the rubber pellets within the cavity or cavities to fill the cavity that defines the approximate final desired shape of the rubber object and at least one tab extending from the object. After a predetermined amount of time has elapsed, the mold may be opened to facilitate the removal of the molded rubber object, for example, by separating the mold top from the mold bottom.

After the mold has been opened, a gripping device may be positioned over the tab of a rubber object. A gripping device may be positioned using, for example, a six-axis arm to place the gripping device at a location corresponding to the tab formed as part of the molded rubber object. The gripping device may then be used to grip the tab. After gripping the tab extending from the rubber object, the gripping device may be moved away from the mold bottom in a direction that is not perpendicular to, and also not parallel to, the mold bottom. In this manner, the gripping device may use the tab to "peel" the rubber object out of the cavity. The tab may be subsequently removed from the rubber object using scissors, a shear, a knife, and/or as part of a standard de-flashing process. Alternatively, a tab may be utilized as part of an object formed using the rubber object.

DRAWINGS

The present invention is described in detail below with reference to the attached drawing figures, wherein:

FIG. 1-5 schematically illustrates an example of a system in accordance with aspects of the present invention;

FIGS. 6-7 illustrate examples of an X-Y table used to position a rubber pellet dispenser relative to an exemplary mold;

FIG. 49 illustrates an example of a mechanical arm, a dispenser, and a gripping device in accordance with aspects of the present invention.

DETAILED DESCRIPTION

The present invention provides systems and methods for fabricating rubber parts, particularly for use in shoe production. The systems and methods may form rubber objects, such as parts for incorporation into a product. Aspects of the present invention may utilize a mold with a cavity that defines the size and shape of a desired part, and that further provides at least one gap that defines a tab extending from the desired part. A mold may be designed such that a tab extends from a portion of a part, such as the perimeter of the part corresponding to the junction of mold components, which will likely have flash around that edge. For example, a cavity corresponding to a desired tab may be provided in one or more portions of a mold at or near where the faces of two or more mold portions (e.g., a top and a base) meet when closed, although a cavity to form a tab may be located anywhere within a cavity and the ultimate molded rubber object. For example, a tab may be oriented partially or entirely within the interior of an object. Further, more than one cavity to form a tab may be provided in a mold cavity to produce more than one tab on the corresponding molded object, in which case different tabs may be located differently relative to the molded object formed.

A tab extending from a molded rubber object may be substantially less thick than the rubber object molded. For example, the tab extending from the molded rubber object may be no more than 20% the thickness of the molded rubber object itself, or even no more than 10% the thickness of the molded rubber object itself. While different rubber formulations and different molded part forms will have different properties, a tab may be sufficiently thick to resist breaking or tearing when used to peel the molded rubber object from the cavity after molding while being sufficiently thin to be easily removed from the molded rubber object if removal of the tab is desired. Further, a tab thickness may be minimized to reduce material usage while also being thick enough to allow rubber to enter into the cavity defining the tab under heat and/or pressure. A tab may extend at any angle relative to a molded rubber object at which the tab may be grabbed by a gripper used to remove the molded rubber object from the mold. Generally, the tab may protrude perpendicularly from the part of the molded rubber object to which the tab is adjacent. In some examples, a tab may extend substantially perpendicular to the top surface of a molded rubber object, but other angles may be used for tabs, and rubber objects formed need not have planar top surfaces. The length of a tab extending from a molded rubber object may vary, for example, based upon the size of any gripping device that will be used to grip the tab as part of the de-molding process for the molded rubber object.

Figure 1:
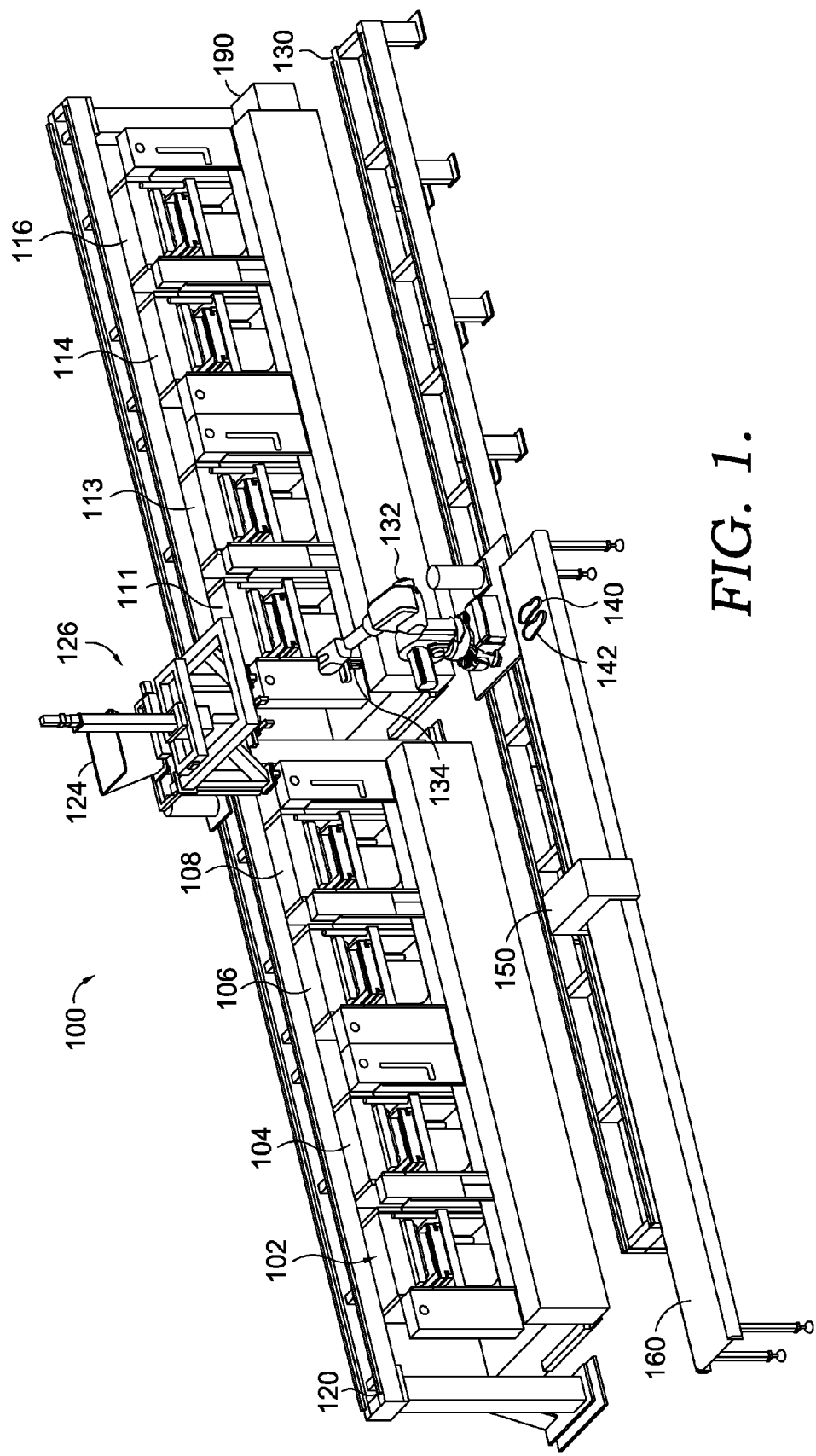

Referring now to FIG. 1, a rubber molding and de-molding system 100 for the automated molding of rubber parts is illustrated in a perspective view. The system 100 comprises two banks of molding stations served by a rubber dispensing station 126. The rubber dispensing station 126 moves along the rail 120 to dispense rubber pellets from the hopper 124 into molds associated with each of the molding stations. The molding stations shown include molding station 102, molding station 104, molding station 106, molding station 108, molding station 111, molding station 113, molding station 114, and molding station 116. The molding stations may each have the same mold or different molds. For example, each molding station could have a mold for the outsole of the same model shoe but a different size. The function of an exemplary molding station will be illustrated in more detail subsequently.

The system also comprises a mechanical arm 132 that removes the cured rubber objects 140 and 142 from the molding stations and places them on conveyance mechanism 160. Conveyance mechanism 160 carries the cured rubber objects 140 and 142 to a subsequent process (e.g., packaging, assembly, buffing, deflashing). The conveyance mechanism 160 may comprise a conveyor belt, a system of pushers and rollers, a chain or belt drive system. The mechanical arm 132 moves along rail 130 to access each of the molding stations.

Figure 2:
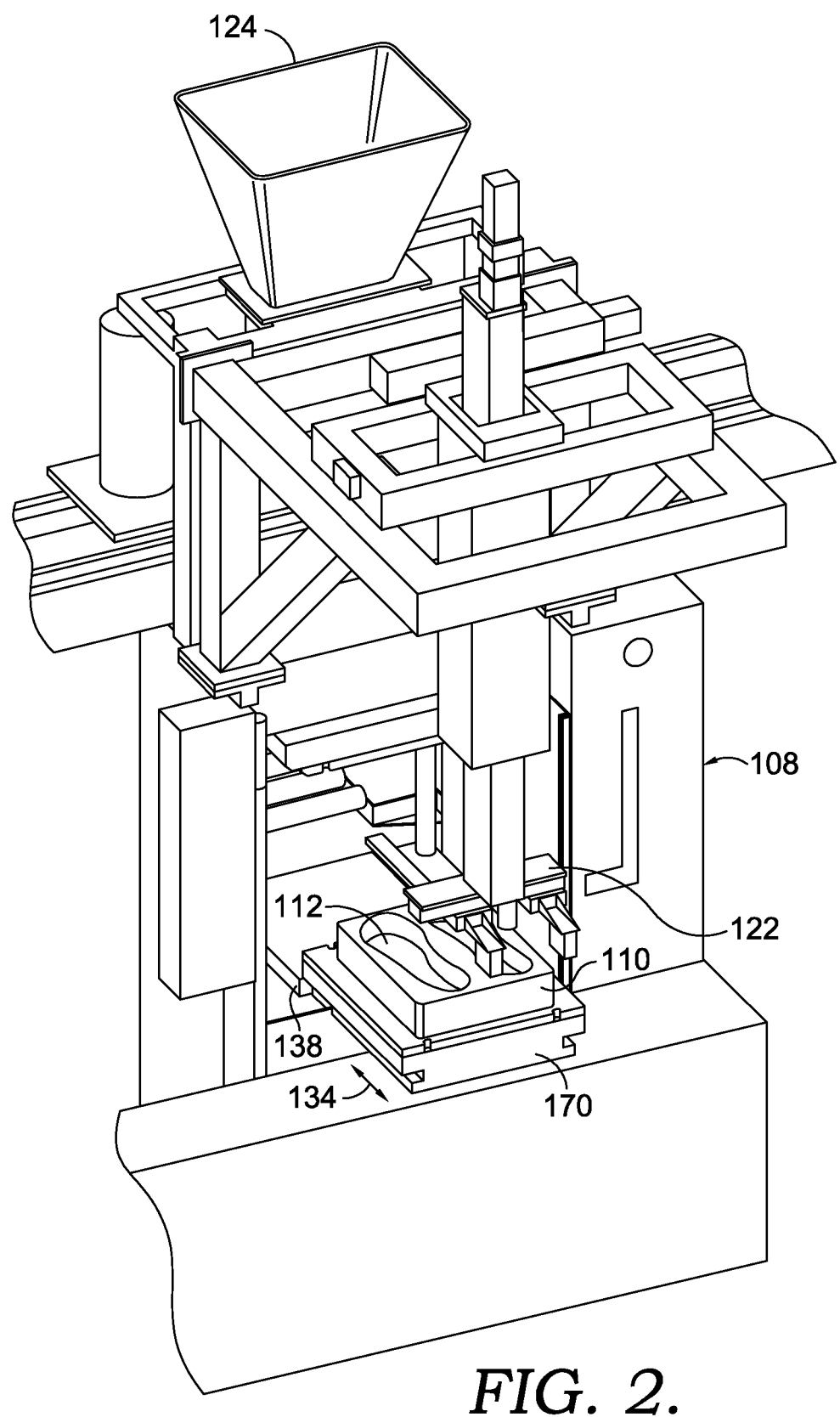

Turning now to FIG. 2, a close-up view of the dispensing station 126 and an exemplary molding station 108 is shown in a perspective view, in accordance with an aspect of the present invention. A mold bottom 110 may provide at least one cavity 112 corresponding to the approximate desired size and shape of a finished molded part. The mold bottom 110 may sit on a lower portion 170 of a heat press that is part of the molding station 108. The mold bottom 110 and lower portion 170 may slide out from the interior of the molding station 108 on tray apparatus 138 to receive rubber pellets from the dispenser 122.

The dispensing station 126 may dispense predetermined amounts of rubber pellets into a cavity 112 within the mold bottom 110 after the mold bottom 110 is in position under the dispenser. The dispenser 122 may be positionable in at least two dimensions at dispensing station 126. Dispenser 122 may be positionable using mechanisms such as an X-Y table, a mechanical arm, or other mechanisms.

Rubber pellets dispensed by dispenser 122 at dispensing station 126 may comprise uncured or partially cured pieces of rubber that are each substantially smaller than the cavity 112 used for molding. Rubber pellets may be spherical, cylindrical, cubical, rectangular, irregular, or any other shape. Rubber pellets may be formed through processes such as cutting, extrusion, etc. Anti-tack materials, in powder, liquid, or other form, may be incorporated as part of the rubber pellets dispensed at dispensing station 126. Dispensing station 126 may either contain or operably connect to a reservoir (not shown) that provides a supply of rubber pellets to the hopper 124. The hopper 124 is connected to the dispenser 122 in a manner that allows rubber pellets to pass from the hopper 124 to the dispenser 122. Once the rubber pellets have been dispensed, the mold bottom 110 and the lower portion 170 slide back into a mold opening within the molding station 108.

Figure 3:
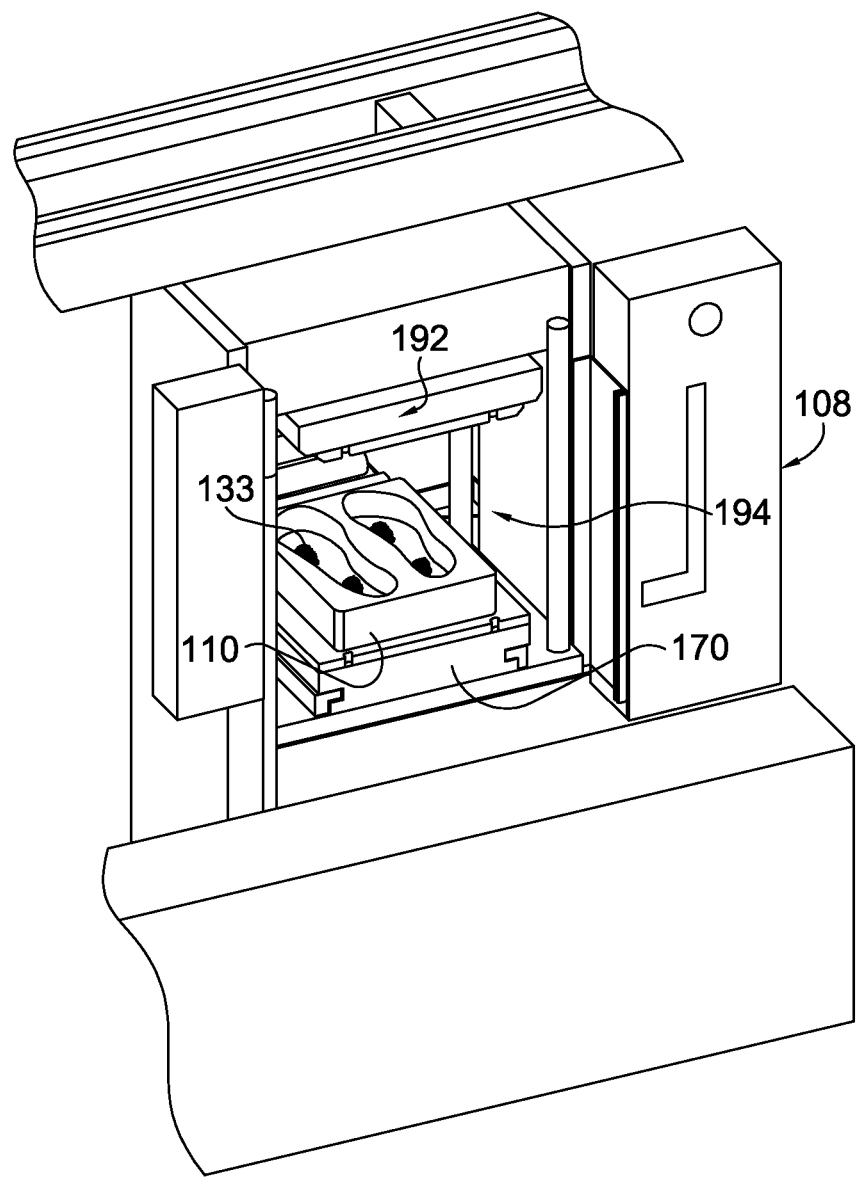

Turning now to FIG. 3, a perspective view of open molding station 108 is shown. After a predetermined amount of rubber pellets 133 has been dispensed by dispenser 122 into a cavity 112 of the mold bottom 110, the bottom may be returned to the mold opening 194 within molding station 108. The mold opening 194 is part of the heat press 192 within the molding station 108. 133

Figure 4:
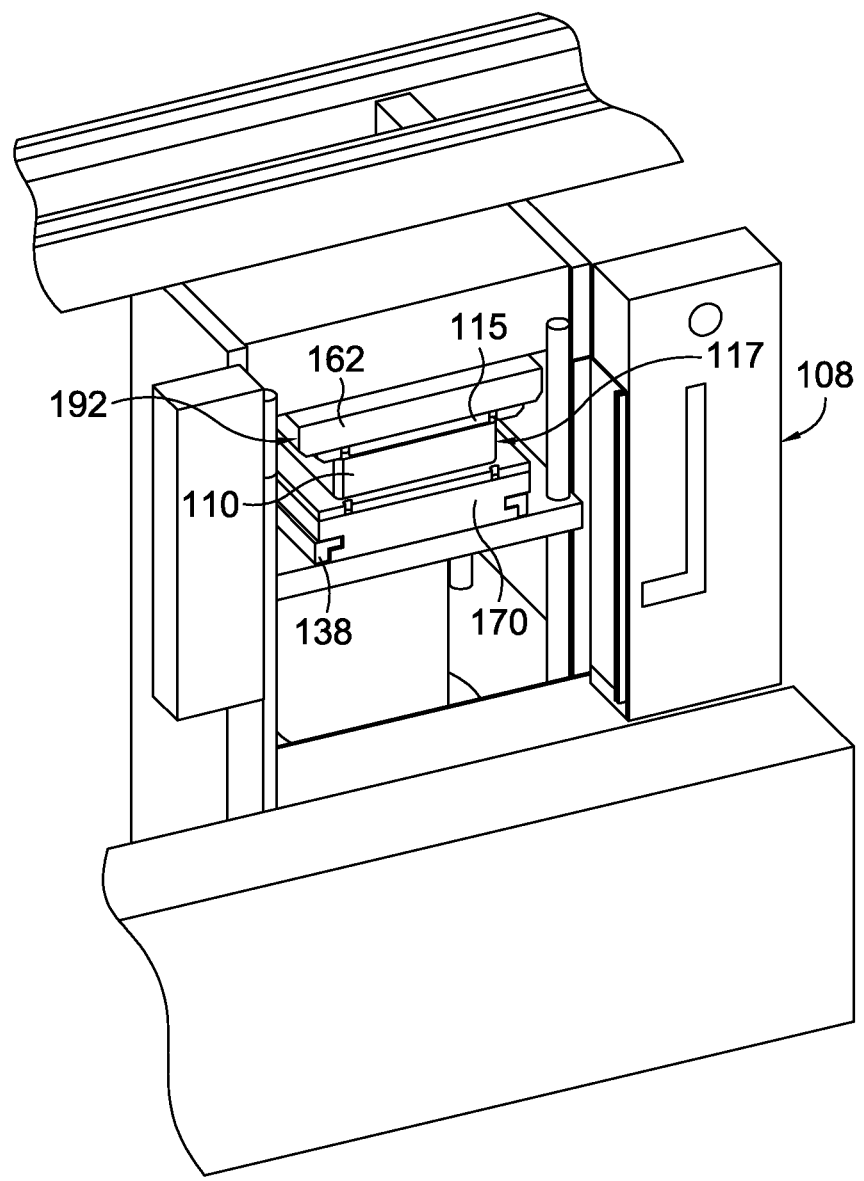

FIG. 4 shows a perspective view of a closed molding station 108. As shown in FIG. 4, the mold apparatus 117 (alternatively described as the mold) can be closed when the mold top 115 is brought together with the mold bottom 110. The molding station 108 may provide heat and/or pressure to liquefy and cure rubber pellets dispensed within the mold apparatus 117. The heat may be applied by heat press 192. Heat press 192 comprises an upper portion 162 and a lower portion 170, both of which may comprise heat elements. As explained in examples below, molding station 108 may further comprise machinery or equipment that closes a mold by, for example, applying a mold top to a mold bottom for the application of heat and/or pressure by a heat press or other means.

Figure 5:
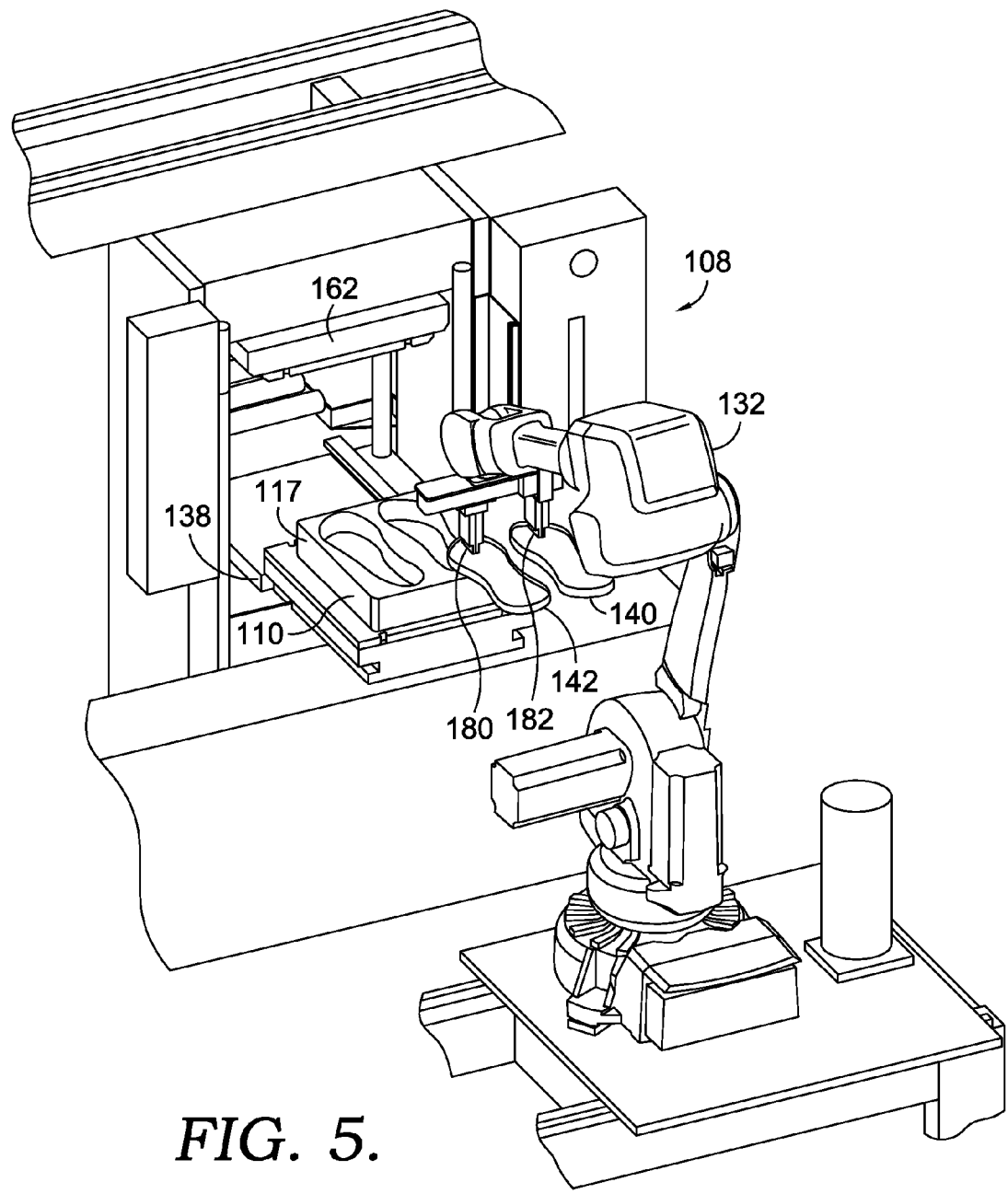

FIG. 5 shows a perspective view of the rubber objects 140 and 142 being removed from the mold bottom 110. After molding station 108 has applied a predetermined amount of heat and/or pressure for a predetermined amount of time (or until a desired observed condition such as internal mold temperature has been met), the mold apparatus 117 opens and grippers 180 and 182 attached to the mechanical arm 132 remove the cured rubber objects 140 and 142, as shown in FIG. 5. The gripping device can engage a tab formed in a molded rubber object for purposes of de-molding the finished rubber object.

After a rubber object has been removed from the mold bottom 110, a trimming and/or de-flashing station 150 may remove any undesirable flash from the molded rubber object and/or remove the tab used by the grippers 180 and 182 to remove the rubber object from the mold bottom 110. Tab removal and de-flashing may be alternatively performed at different stations or, in other alternatives, omitted. Further examples of a de-flashing and/or trimming station 150 are described in examples below.

The operation of the various components of system 100 may be controlled by a computing device 190 operating via a connection to the various components described herein. For example, computing device 190 may control the operation of the molding stations, the dispensing of rubber pellets at dispensing station 126, the amount of pressure, heat, or other parameters applied at molding stations, the de-molding operations, any de-flashing/trimming operations at trimming stations, cleaning and mold preparation operations, etc. Computing device 190 may comprise one or multiple computing devices with processing units and digital memory executing computer-readable code to cause system 100 or other systems in accordance with the present invention to perform their operations in accordance with the present invention.

Referring now to FIG. 6, a top view of an exemplary dispenser 122 is illustrated. The dispenser 122 utilizes an X-Y table 605 to move dispensing cups 622 and 624 in two dimensions to position the cups 622 and 624 at one or more desired locations over cavity 112 of mold bottom 110 for the dispensing of rubber pellets. Other dispensing stations may be used in accordance with aspects of the present invention, such as dispensers mounted on articulated mechanical arms, dispensers rigidly affixed at a given location that permit the mold bottom 110 to be positioned at one or more desired locations beneath the dispenser 122, etc.

Figure 50:
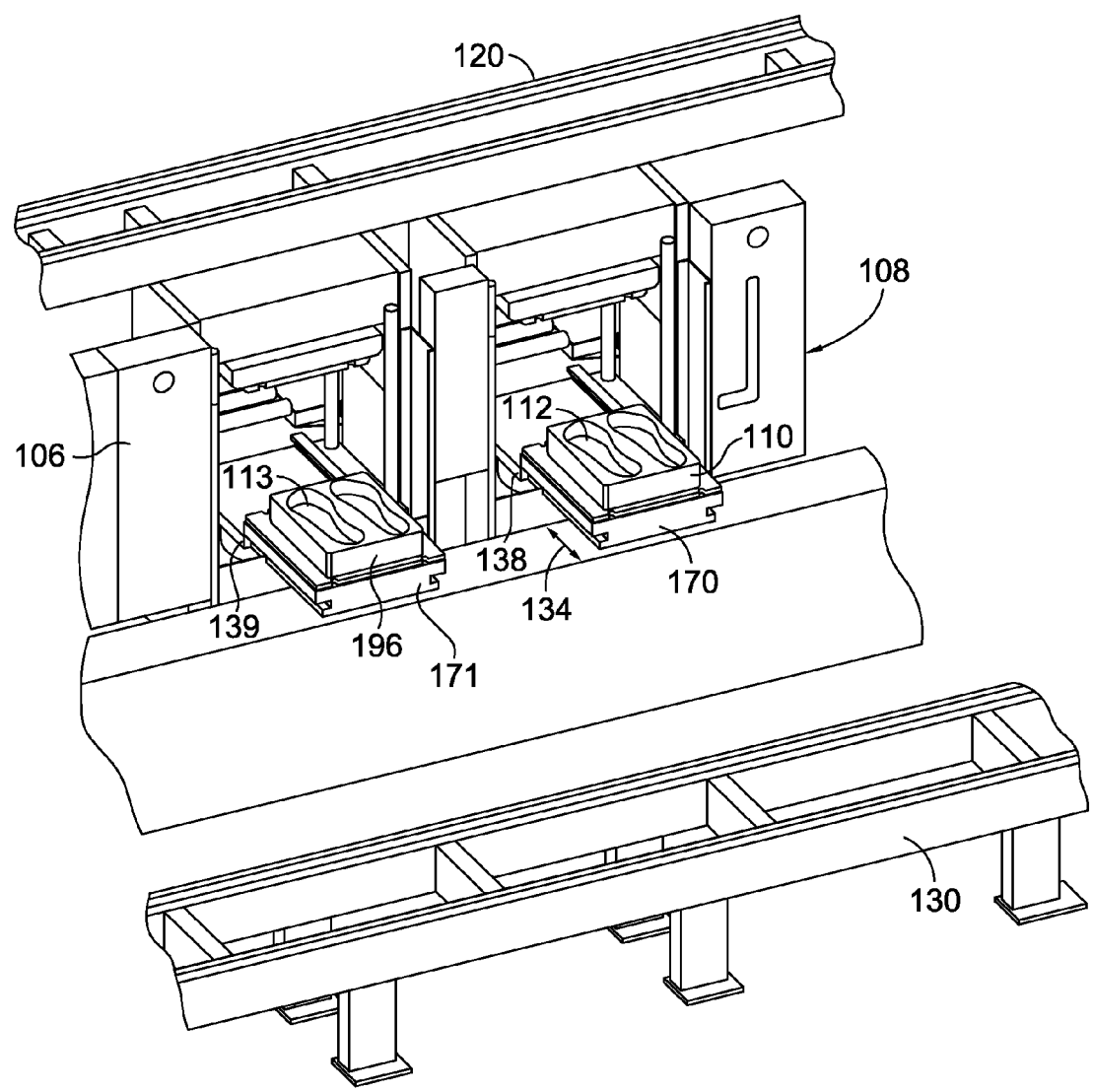
FIGS. 50-58 illustrate coordinated movements within a molding and de-molding system in accordance with aspects of the present invention.

FIGS. 50-58 use a perspective view of part of system 100 illustrated coordinated actions of components within system 100. Initially, FIG. 50 shows molding station 108 and molding station 106 in an open position ready to receive pellets. The components of molding station 108 have been described above and the components of molding station 106 are similar. The components of molding station 106 comprise a mold bottom 110, having cavity 119. The mold bottom 110 is resting on lower portion 171 of a heat press. The lower portion 171 slides in and out of the molding station 106 on tray apparatus 139.

Figure 51:
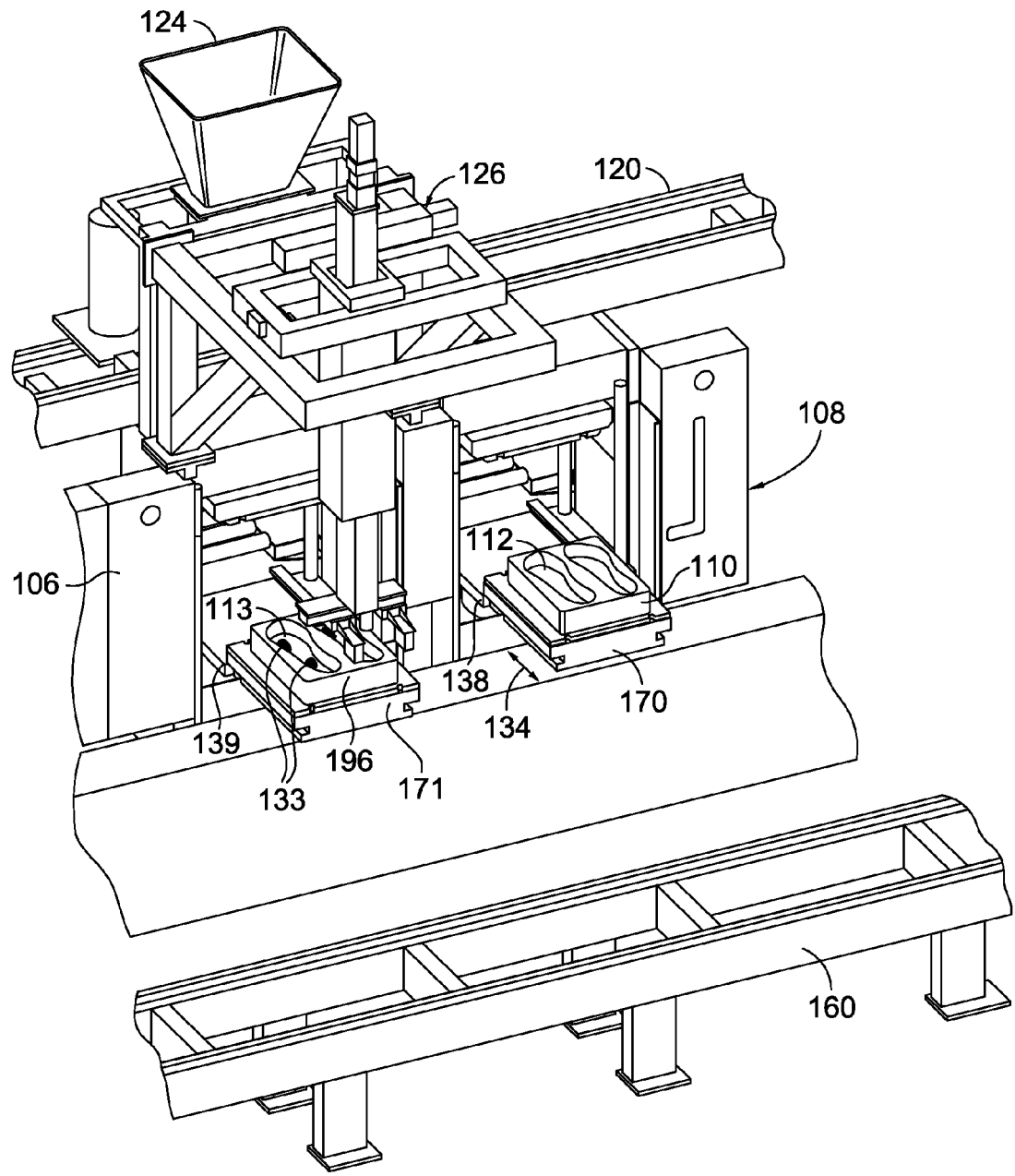

Turning now to FIG. 51, a dispensing operation is illustrated. As can be seen, the dispensing station 126 has moved adjacent to molding station 106. The dispensing station dispenses rubber pellets 133 within a cavity 119.

Figure 52:
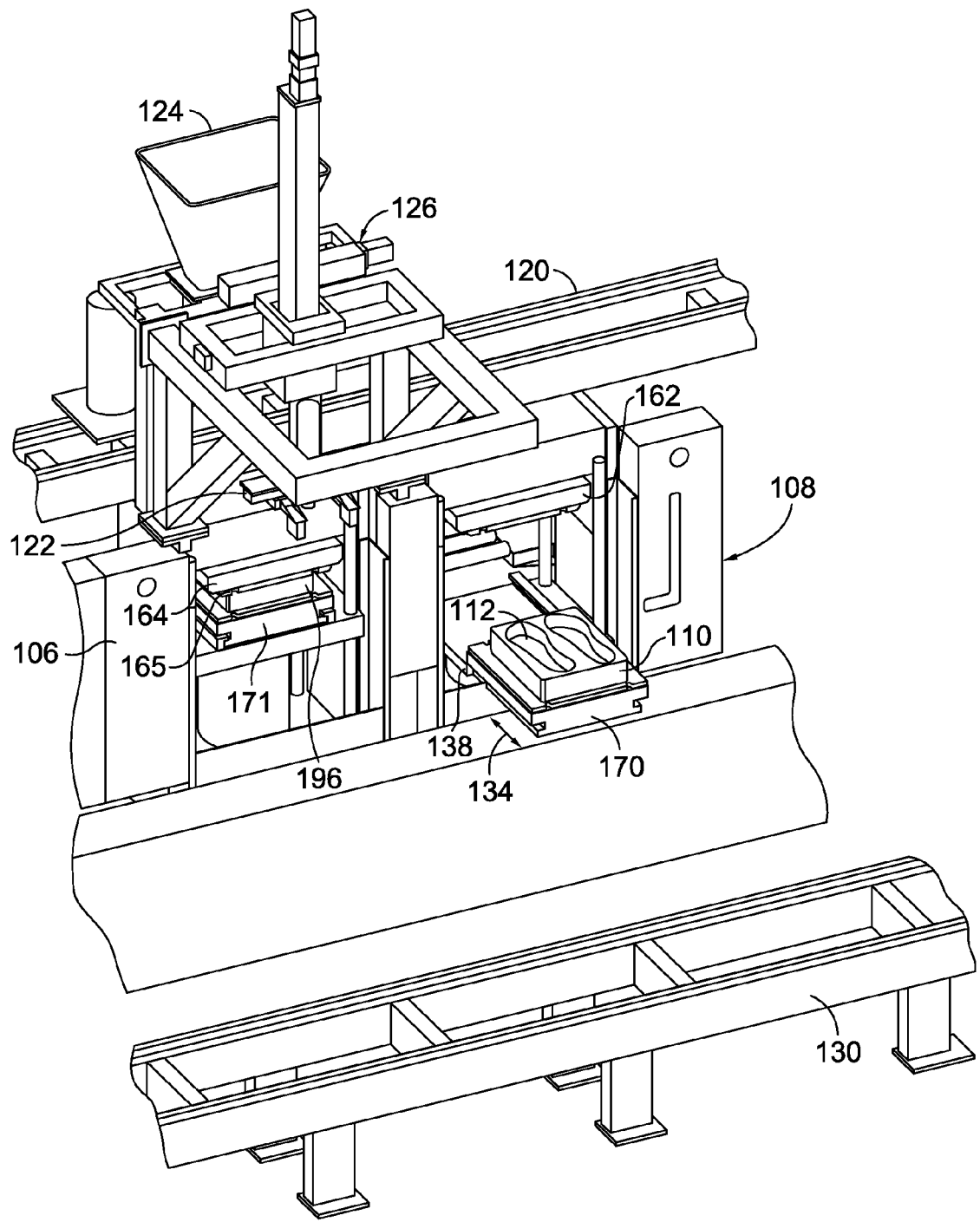

Turning now to FIG. 52, the transition of molding station to the closed position is illustrated. As can be seen, the lower portion 171 and the mold bottom 196 have been withdrawn into the molding station 106. The mold top 165 has been placed on the mold bottom 196 to enclose cavity 119. The upper portion 164 can apply pressure and heat to the closed mold formed from mold bottom 196 and mold top 165. The components of molding station 108 remaining in the open position ready to receive pellets. The dispenser 122 on the dispensing station 126 has been raised in preparation for movement to molding station 108. In one aspect, dispensing cups (not shown) within the dispenser 122 are prefilled at this point in preparation for dispensing pellets once the dispensing station 126 arrives at the molding station 108.

Figure 53:
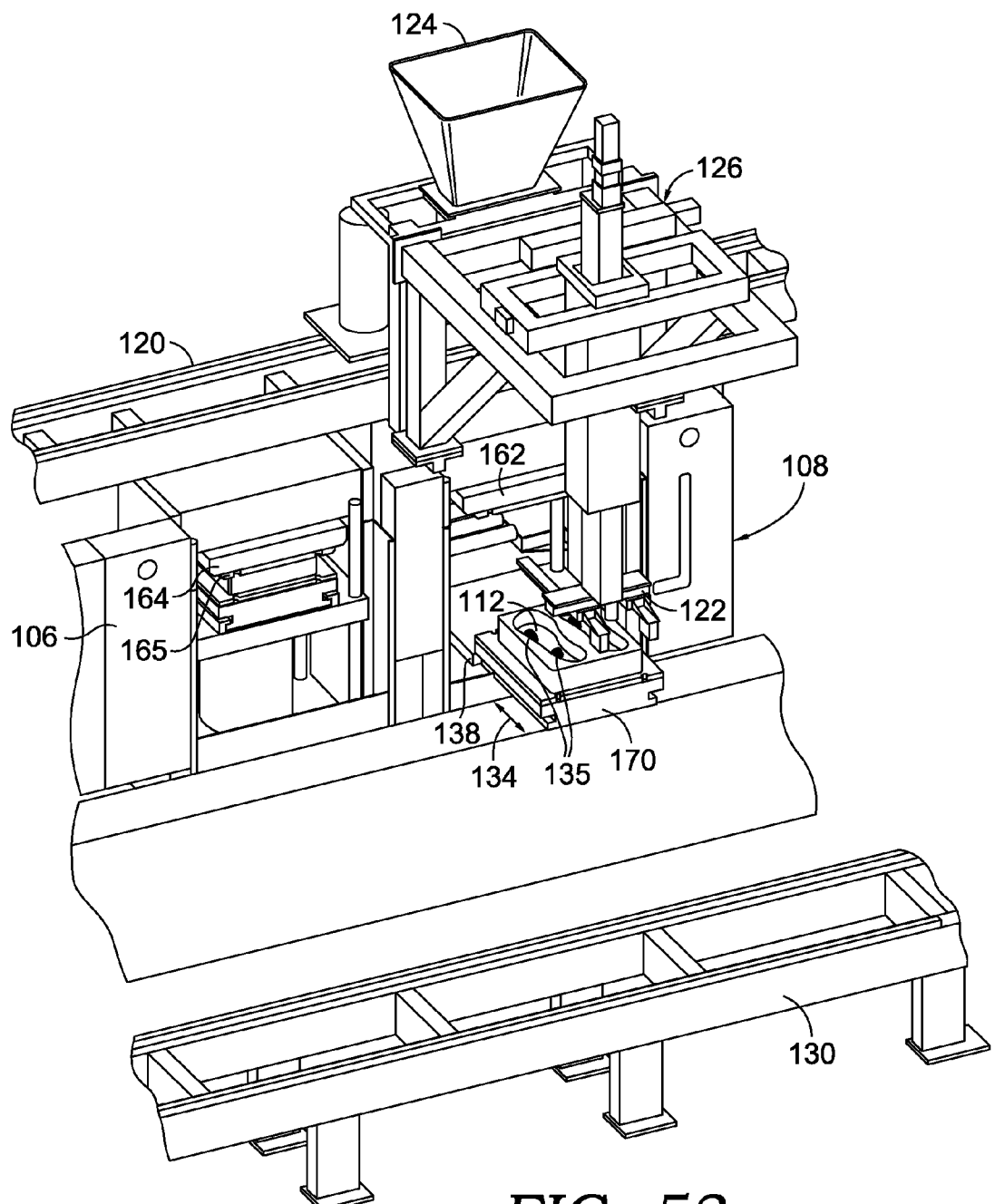

Turning now to FIG. 53, the dispensing operation is illustrated with reference to molding station 108. Molding station 106 remains in the closed position. Molding station 106 may remain in the closed position for a duration sufficient to vulcanize the rubber pellets 133 with the cavity 119, for example five minutes. As can be seen, dispenser 122 has lowered to a dispensing position over cavity 112 and has dispensed pellets 135 in at least two different locations.

Figure 54:
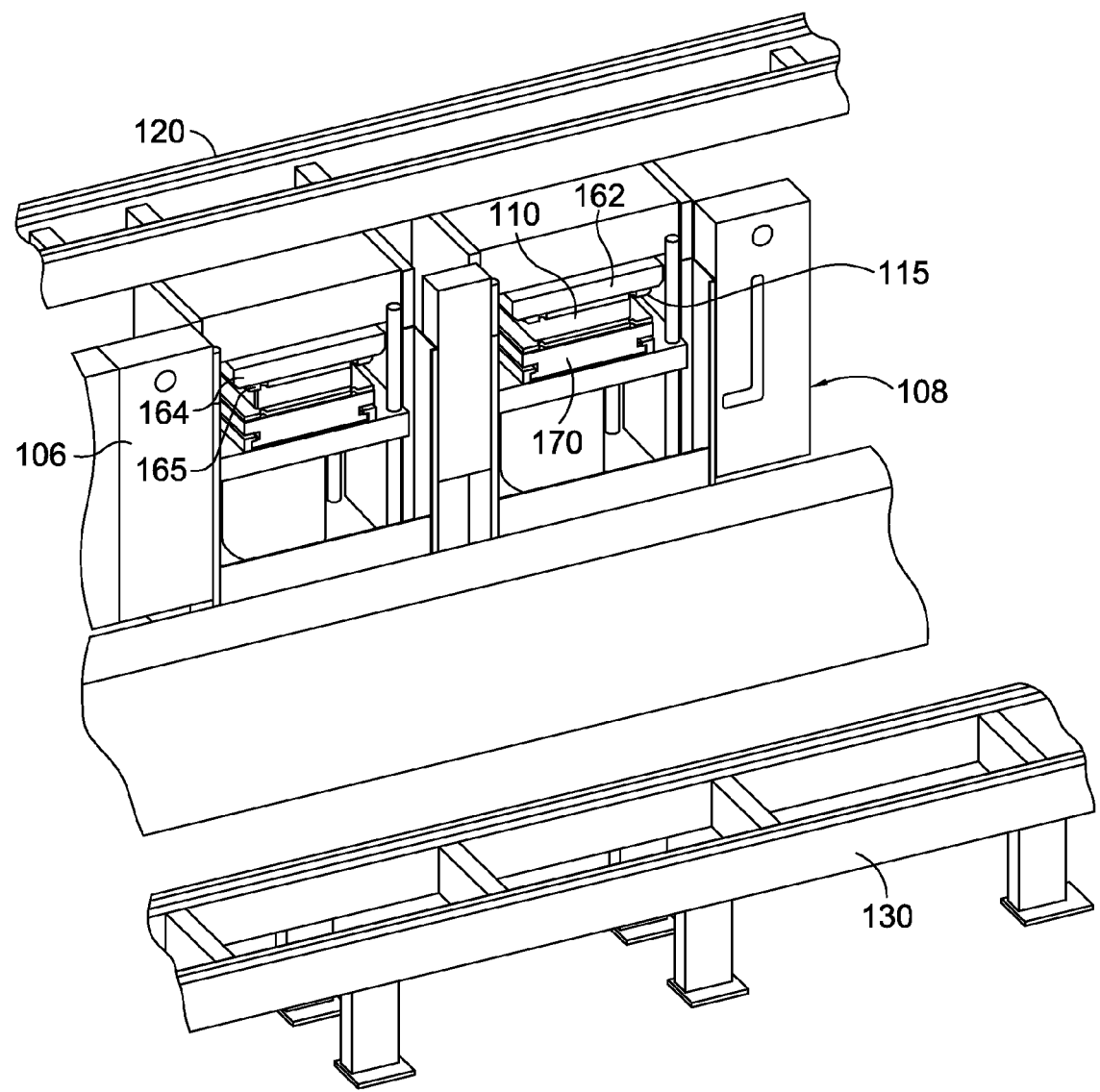

Turning now to FIG. 54, the transition of molding station 108 to the closed position is illustrated. As can be seen, the lower portion 170 and the mold bottom 110 have been withdrawn into the molding station 108. The mold top 115 has been placed on the mold bottom 110 enclosing cavity 112. Upper portion 162 can apply heat and pressure to the closed mold formed by mold bottom 110 and mold top 115.

Figure 55:
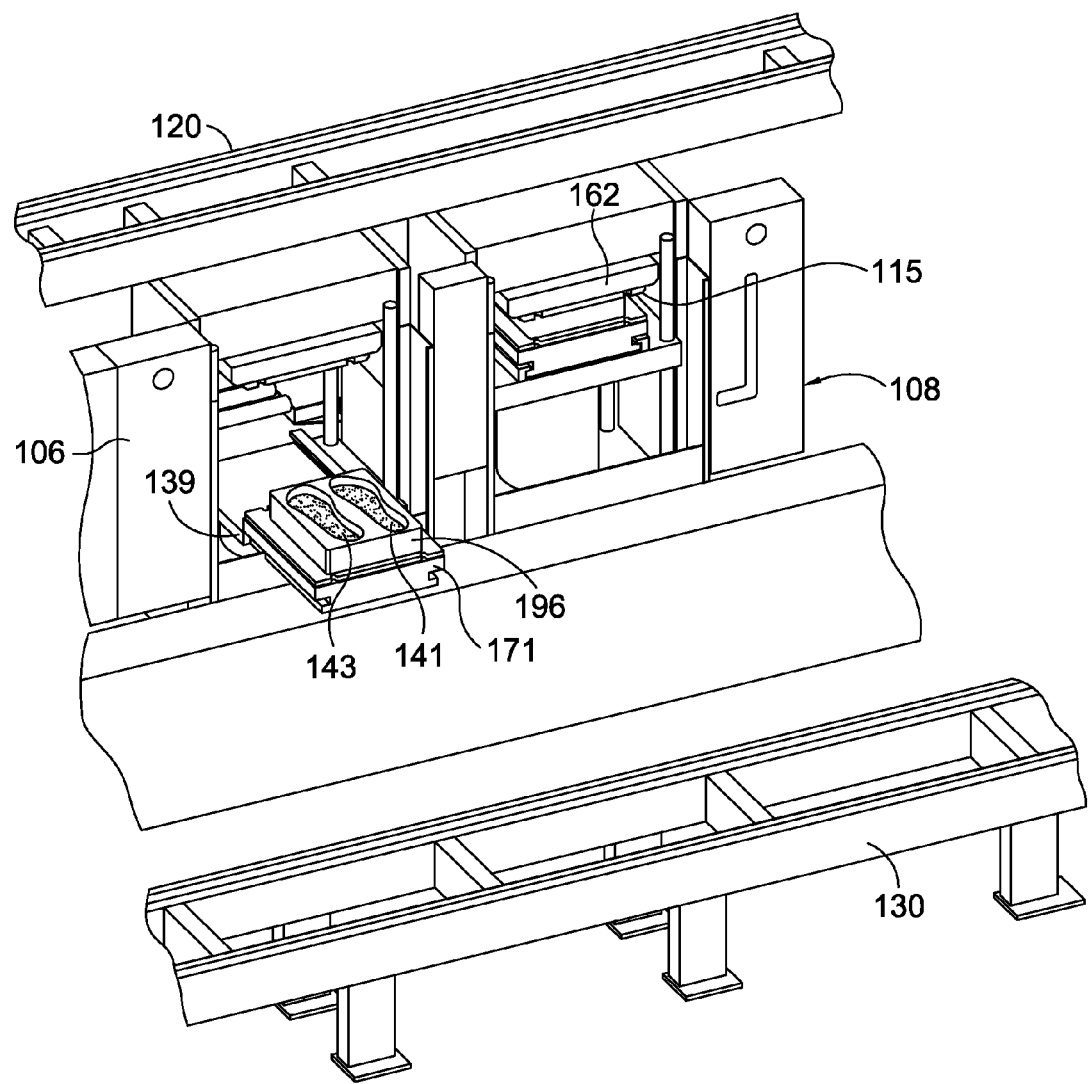

Turning now to FIG. 55, the opening of molding station 106 in preparation for removal of a molded rubber object is illustrated. Mold bottom 196 and lower portion 171 have been extended out from molding station 106. As can be seen, mold bottom 196 contains molded rubber objects 141 and 143.

Figure 56:
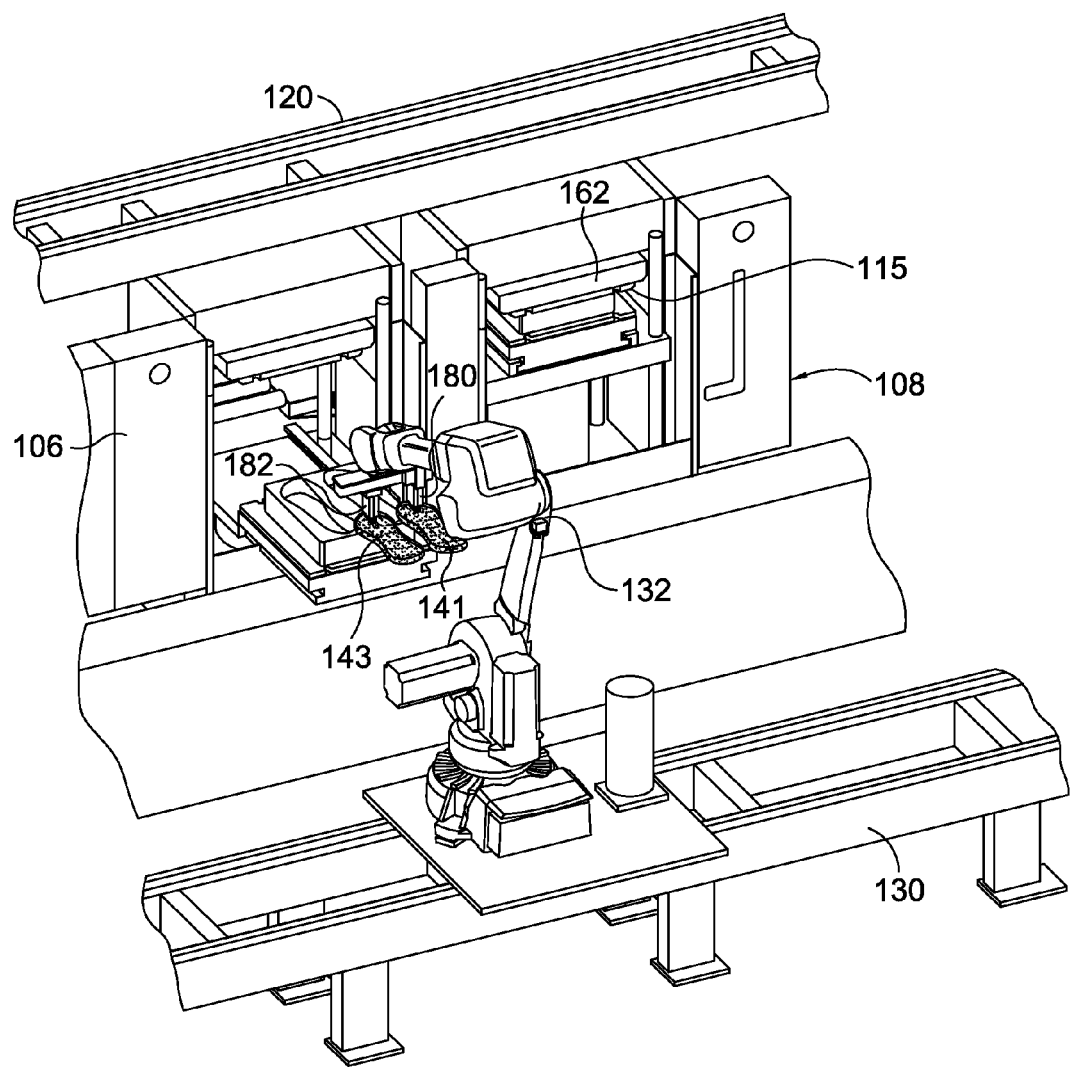

Turning now to FIG. 56, the removal of molded rubber objects is illustrated. Arm 132 has moved to a position on rail 130 across from the molding station 106. The grippers 180 and 182 grab portions of molded rubber objects 141 and 143 respectively. In one aspect, the grippers 180 and 182 grab removable tabs molded with molded objects 141 and 143. As can be seen, molding station 108 remains in a closed position.

Figure 57:
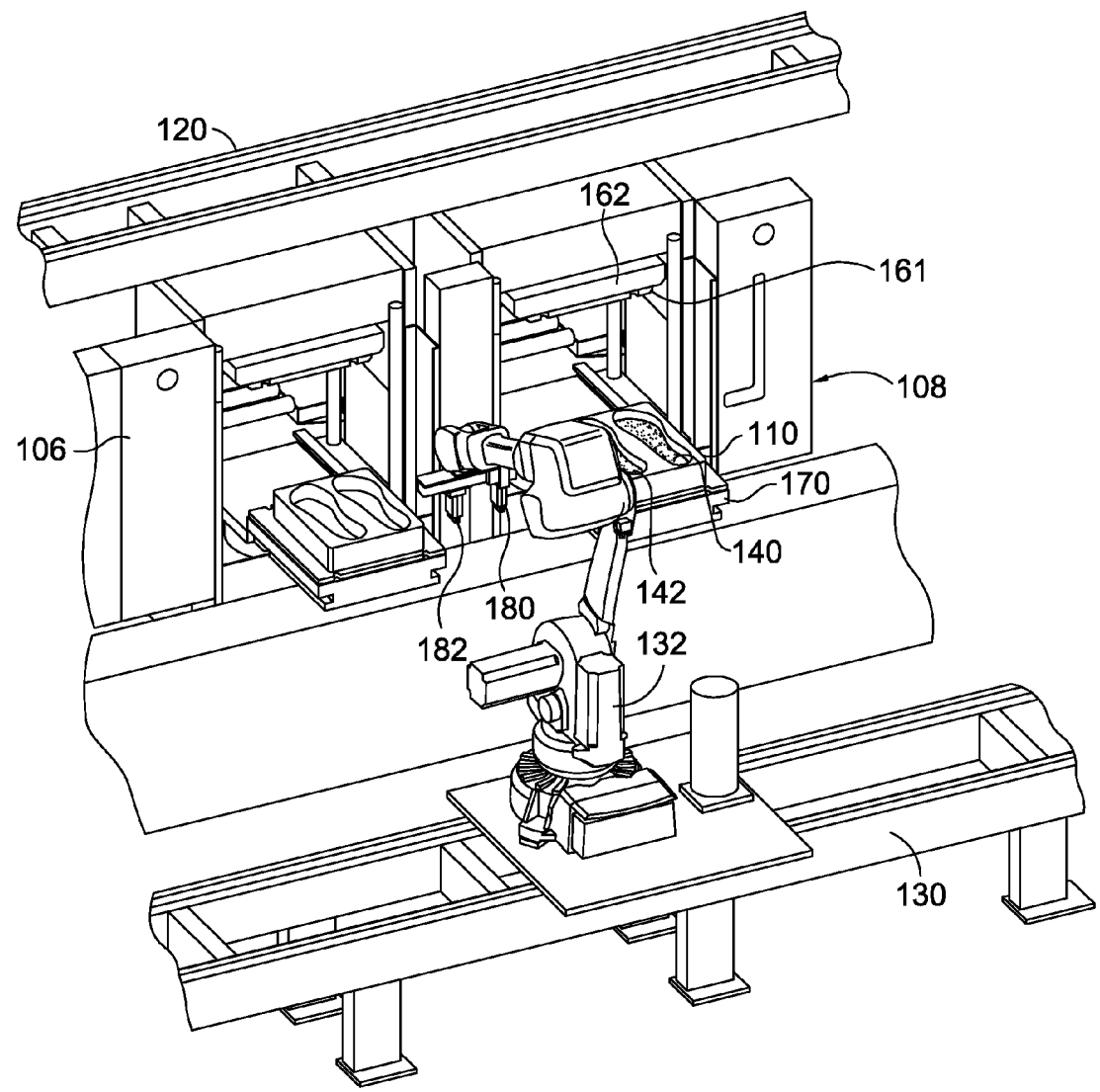

Turning now to FIG. 57, the opening of molding station 108 in preparation for removal of a molded rubber object is illustrated. Mold bottom 110 and lower portion 170 have been extended out from molding station 108. As can be seen, mold bottom 110 contains molded rubber objects 140 and 142. The grippers 180 and 182 are empty, having previously deposited molded objects 141 and 143 on conveyance mechanism 160.

Figure 58:
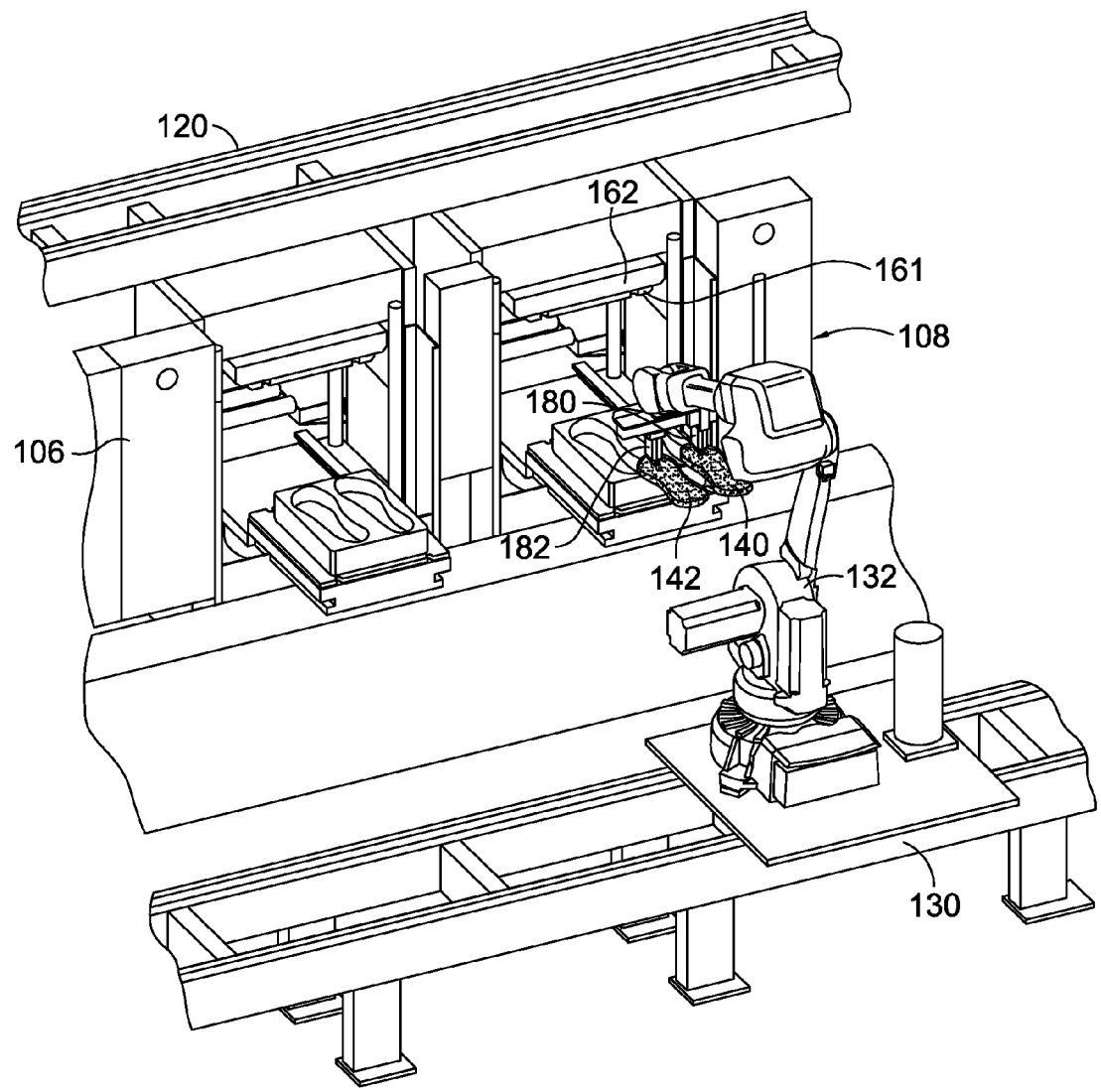

Turning now to FIG. 58, the removal of molded rubber objects from molding station 108 is illustrated. The arm 132 has moved down rail 130 133 a location across from molding station 108. Grippers 180 and 182 have gripped molded rubber objects 140 and 142. In one aspect, the grippers 180 and 182 grab removable tabs molded with molded objects 140 and 142. As can be seen, molding station 106 remains in an open position ready for cooling, cleaning, preparation, and eventually the receipt of more pellets to repeat the molding process.

In the example illustrated in FIG. 6, dispensing cup 622 may move laterally in a first direction 642 along a first arm 620 of the X-Y table 605. Dispensing cup 624 may move in a similar fashion. Meanwhile, first arm 620 may be moved orthogonally to the first direction 642 in second direction 632. Arm 620 may slide along a perpendicular arm 610 to permit dispensing cups 622 and 624 to be positioned at a variety of locations.

Referring now to FIG. 7, a top view of the dispenser 122, such as illustrated in FIG. 6, is illustrated after dispensing cups 622 and 624 have been moved to a first location 720 and second location 740 over a cavity 112. By moving dispenser dispensing cups 622 and 624 in the second direction 632, dispensing cups 622 and 624 may subsequently be positioned at a third location 710 and fourth location 730. In general, the dispenser may permit the dispensing cups 622 and 624 to dispense one or more predetermined amounts of rubber pellets at one or more locations within one or more cavities 112 of the mold bottom 110. As described further in some examples herein, dispensing cups 622 and 624 may be provided with a supply of rubber pellets to dispense in predetermined amounts at locations within at least one cavity 112 provided in the mold bottom 110, such as the first location 720, the second location 740, the third location 710, and/or the fourth location 730. Alternatively, pellets may be distributed throughout the mold, rather than dispensed in locations. The amount of rubber pellets dispensed at a given location may be the same as the amounts dispensed at other locations. Alternatively, the amount of rubber pellets dispensed at various locations may differ. In one aspect, it can be preferable to dispense pellets according to their weight.

Figure 9:
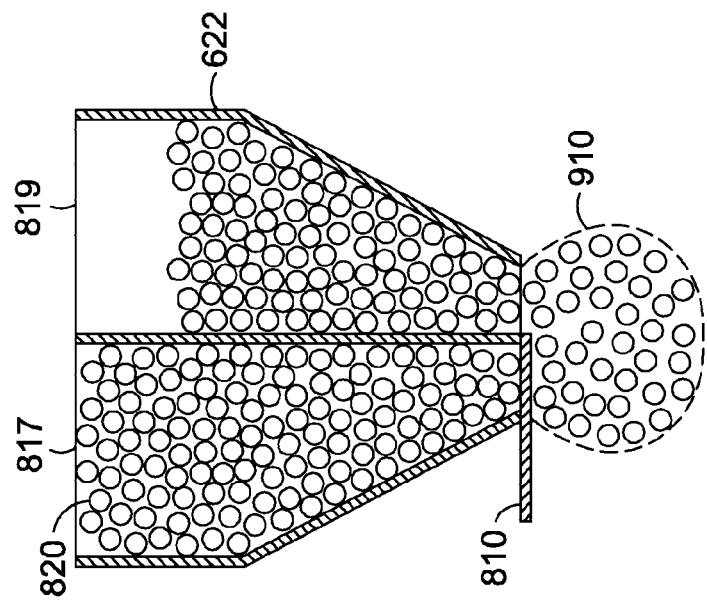
FIGS. 8-9 illustrate an exemplary rubber pellet dispenser.
Figure 8:
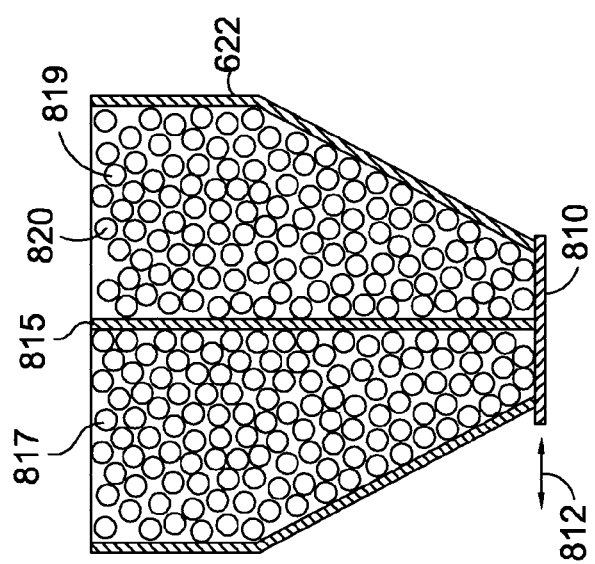

Referring now to FIG. 8, an example of a dispensing cup 622 is illustrated in cross section. Example dispensing cup 622 illustrated in FIG. 8 and subsequently in FIG. 9 is illustrative only, and other types and configurations of cups may be used in accordance with aspects of the present invention. As shown in the example of FIG. 8, dispensing cup 622 comprises a substantially funnel-shaped housing 814 retaining therein a plurality of rubber pellets 820. The funnel-shaped housing 814 is bi-furcated by divider 815, creating two separate chambers 817 and 819 within housing 814. Rubber pellets 820 are maintained within dispensing cup 622 by movable flange 810. Flange 810 may be disposed laterally as indicated by arrows 812 to open and close dispensing cup 622 to permit the dispensing of a predetermined amount of rubber pellets 820. The predetermined amount may be determined by weight.

In one aspect, the flange 810 opens halfway to allow chamber 819 to dispense pellets in a first location and then opens fully to allow chamber 817 to dispense pellets at a second location. The dispensing cup 622 may retain or receive amounts of rubber pellets 820 that have been previously measured by volume, weight, or other means to provide a desired predetermined amount. In one aspect, it can be preferable to dispense pellets according to their weight. The amount of rubber pellets 820 dispensed by dispensing cup 622 at a given predetermined location may be determined, for example, by the length of time flange 810 has been opened. Alternatively/additionally, a dispensing cup 622 may use quantities such as volume, weight, etc. rather than time measurements as rubber pellets 820 are dispensed to provide a predetermined amount of rubber pellets at a predetermined location. In one aspect, the appropriate amount of pellets for a location is measured into a chamber and the chamber is then emptied when the dispensing cup 622 is at the location. Thus, in one aspect, the dispensing cup 622 empties the entire chamber at a location.

Referring now to FIG. 9, the cross-section view shows that dispensing cup 622 has dispensed an amount 910 of rubber pellets 820 while flange 810 has been moved laterally to open dispensing cup 622 halfway. Flange 810 may be returned to a closed position (as illustrated in FIG. 8) after the amount 910 of rubber pellets 820 dispensed corresponds to a desired predetermined amount of rubber pellets 820. While flange 810 is illustrated herein at the terminal end of dispensing cup 622, flange 810 may be located within a dispensing cup 622 and/or may comprise multiple flanges or pieces that may be actuated to release rubber pellets 820 from dispensing cup 622. Further, one or more flange 810 may be actuated by hinging, sliding, or other movements other than lateral movement as shown in the present example. Though not shown, the dispensing cup 622 may include vibrators, thumpers, augers, or another apparatus to facilitate the rubber's exit from the dispensing cup 622.

Figure 10:
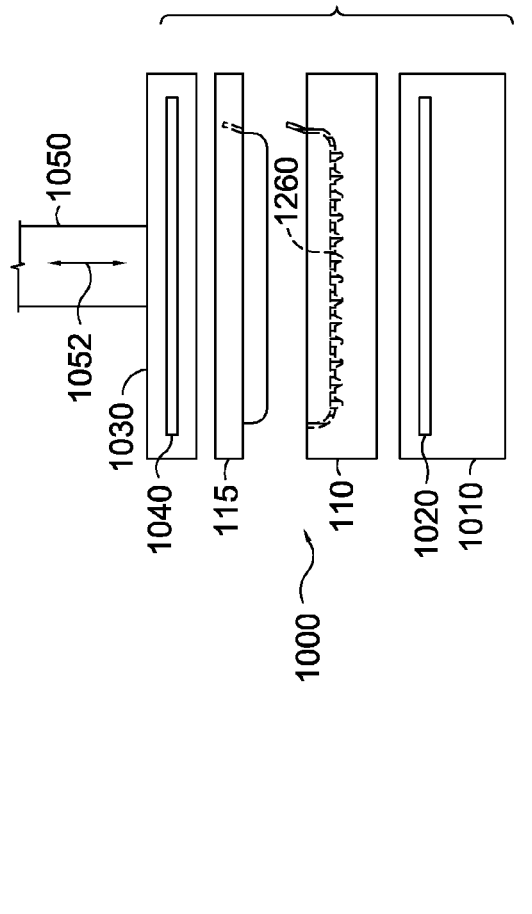
FIGS. 10-12 illustrate an exemplary mold and heat press.
Figure 11:
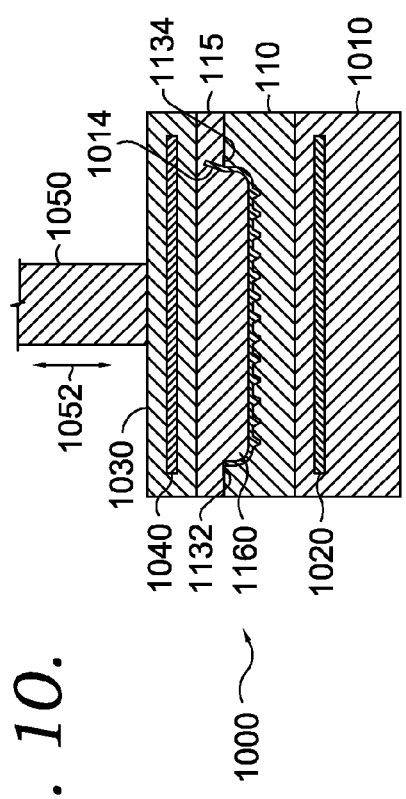
Figure 12:
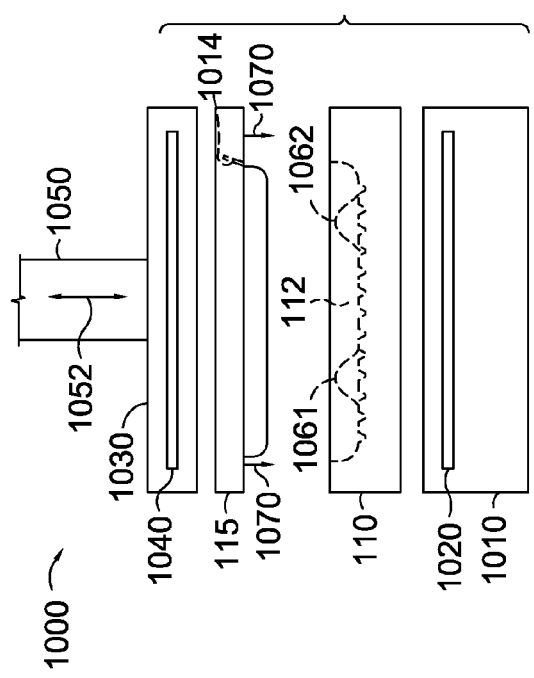

Referring now to FIGS. 10-12, an exemplary heat press station 1000 is illustrated. Heat press station 1000 may be part of a molding station (e.g., heat press station 141 within molding station 108) or stand separately. The mold illustrated previously comprising mold bottom 110 and mold top 115 is used with FIGS. 10-12, but other molds could be used in different aspects. As illustrated in FIG. 10, a side view of the mold bottom 110 having a cavity 112 is illustrated. A first predetermined amount of pellets 1061 has been dispensed at a first location within cavity 112, and a second predetermined amount of rubber pellets 1062 has been dispensed at a second location within cavity 112. A mold top 115 for the mold bottom 110 with a tab form 1014 component has been provided. Mold top 115 and the mold bottom 110 may be closed as indicated by arrow 1070 to enclose pellets 1061, 1062 within cavity 112. It should be noted that cavity 112 and the tab form 1014 component provided are for illustrative purposes only in FIG. 10. Some examples of different tab form 1014 orientations are further described below for illustrative purposes. A base portion 1010 of a heat press may receive and retain the mold bottom 110. A heating element 1020 may generate heat for application to the mold assembly and, subsequently, pellets 1061, 1062 within cavity 112.

The heat press may further comprise a top portion 1030 with a heating element 1040 provided therein. Top portion 1030 may be actuated as indicated by arrow 1052 by a piston 1050 to apply pressure to the mold top 115, the mold bottom 110, base portion 1010, and ultimately pellets 1061, 1062 within cavity 112 as desired. The application of heat and/or pressure may accordingly cause the pellets 1061, 1062 to entirely or partially liquefy and spread through cavity 112.

Referring now to FIG. 11, a cross-section of the heat press station 1000 is shown. Top portion 1030 of the heat press has been applied by piston 1050 to apply pressure to the closed mold assembly in conjunction with base portion 1010. Under the application of heat and pressure, the pellets 1061, 1062 illustrated in FIG. 10 have filled the cavity 112 and the associated tab form 1014. In this manner, a rubber object 1160 conforming in size and shape to the cavity 112 and tab form 1014 may be formed.

A flash channel can be provided around the exterior of the cavity at a point where the mold top 115 and the mold bottom 110 come together to form cavity 112. The flash channel is visible at the left end 1132 and the right end 1134 of the flash channel. The flash channel may extend a few millimeters from the cavity. The flash channel allows excess rubber to flow from the cavity. The resulting flash can be removed from the resulting object after the object is removed from the mold.

FIG. 12 shows a side view that illustrates the separation of the top portion 1030 of the heat press station 1000 to permit the removal of mold top 115 from the mold bottom 110. As illustrated in FIG. 12, the rubber object 1160 produced as shown in FIG. 11 by the application of heat and/or pressure has been allowed to at least partially solidify into a solid rubber object 1260. As can be seen in FIG. 12, rubber object 1260 has taken the shape and form of cavity 112 and the associated tab form 1014.

Figure 13:
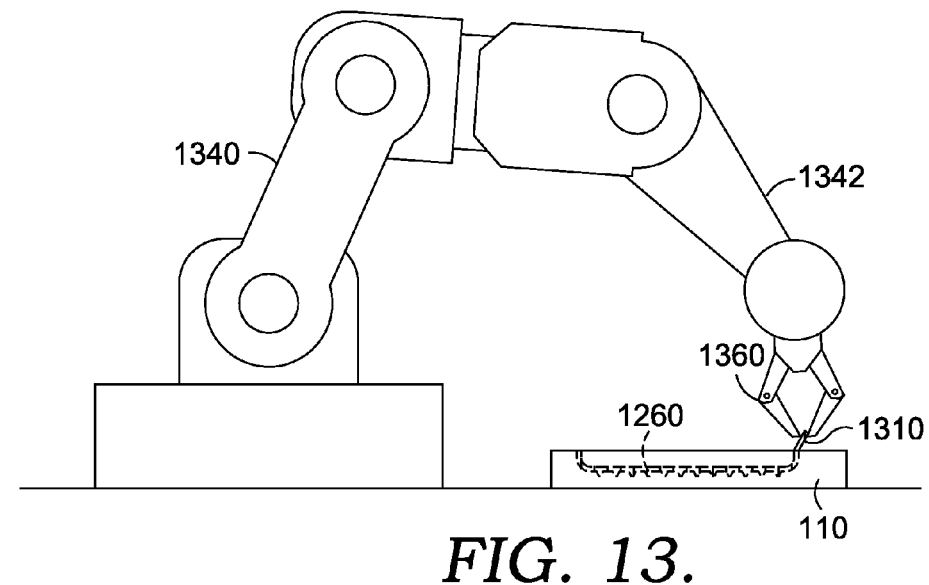
FIGS. 13-16 illustrate examples of a gripping device and arm for use in removing a rubber object from a mold.

Referring now to FIG. 13, a side view of a gripping device 1360 is shown. The gripping device 1360 may be positioned over the tab 1310 of the rubber object 1260 while within mold bottom 110. Gripping device 1360 may be positioned using a mechanical arm 1340. Mechanical arm 1340 may carry gripping device 1360 at the terminal end 1342 of the arm 1340. A computing device may cause mechanical arm 1340 and gripping device 1360 to engage the tab 1310 for removal.

Figure 14:
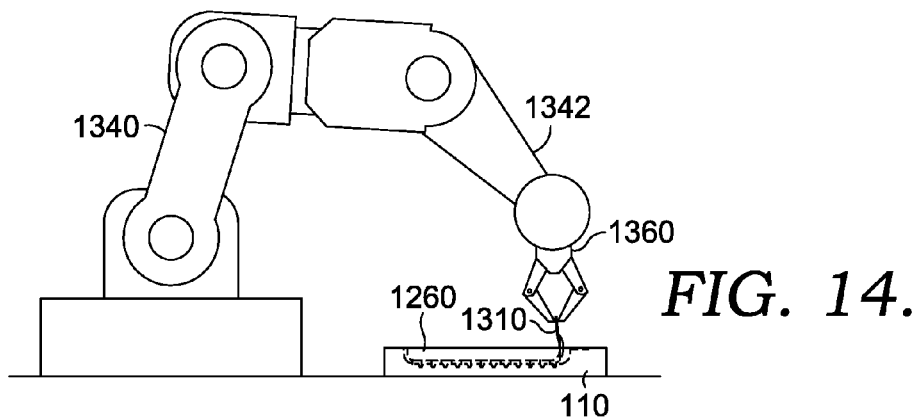

As shown in FIG. 14, gripping device 1360 has used the tab 1310 of rubber object 1260 to begin lifting rubber object 1260 from cavity 112.

Figure 15:
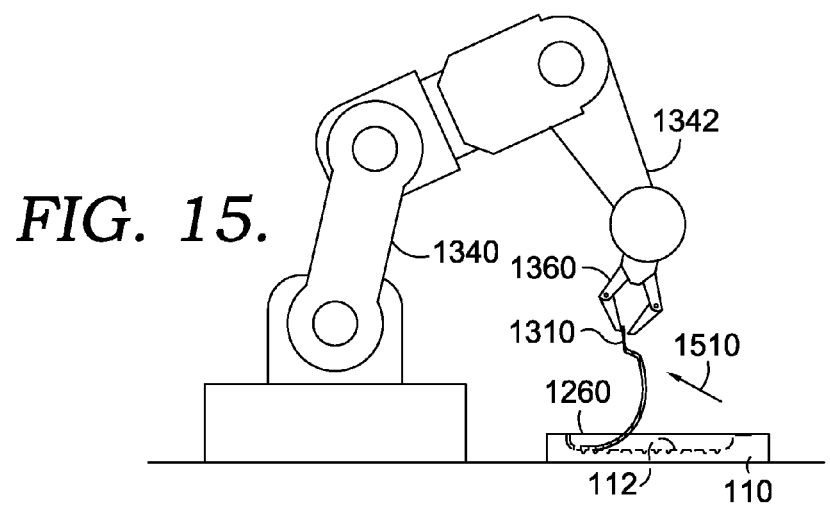

FIG. 15 illustrates an example of gripping device 1360 having nearly entirely extracted rubber object 1260 from cavity 112 by gripping tab 1310 and moving in an oblique direction 1510 relative to mold bottom 110 to effectively separate rubber object 1260 from mold bottom 110.

Figure 16:
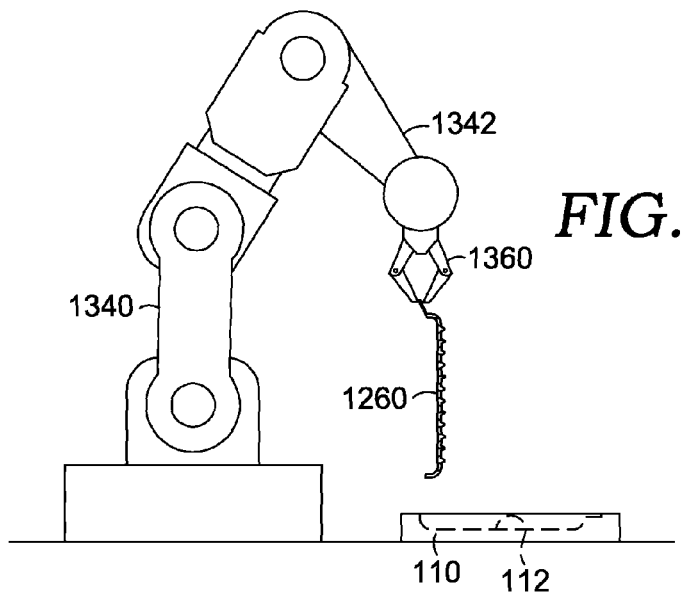

As shown in FIG. 16, a gripping device 1360 moved by mechanical arm 1340 has fully removed rubber object 1260 from cavity 112 of mold bottom 110. The use of release agents or other mold treatments, and/or additives to a rubber mixture or the rubber pellet mixture may facilitate the removal of a formed rubber object 1260 from the cavity 112 of a mold bottom 110 as described herein.

Figure 17:
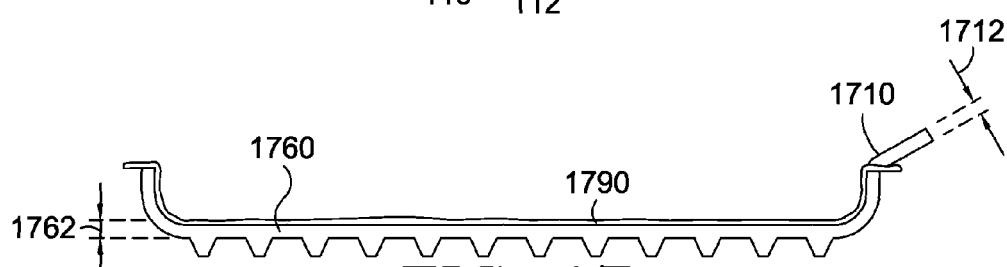
FIGS. 17-25 illustrate examples of various orientations and locations of tabs relative to a rubber object.

Referring now to FIG. 17, a side view of a rubber object that may be formed in accordance with aspects of the present invention is illustrated. Rubber object 1760 may have a tab 1710 extending upwards at an angle from the rubber object 1760. The tab 1710 may extend from either the flash 1790 or the rubber object 1760. The base portion of rubber object 1760 may have a total thickness 1762, while tab 1710 may have a total thickness 1712. In one aspect, the tab is approximately 1 to 1.5 mm thick and 3-5 mm long. Though not shown, the width can be approximately 1 to 5 cm wide. The thickness 1712 of tab 1710 may be, for example, approximately one-fifth the thickness 1762 of base portion or web of rubber object 1760. As further illustrated in FIG. 17, rubber object 1760 may possess flash 1790 corresponding to the junction point of different portions of a mold in which rubber object 1760 was formed. For example, flash may form at the location of a rubber object 1760 corresponding to the junction of mold bottom 110 and mold top 115, such as described above.

Figure 18:
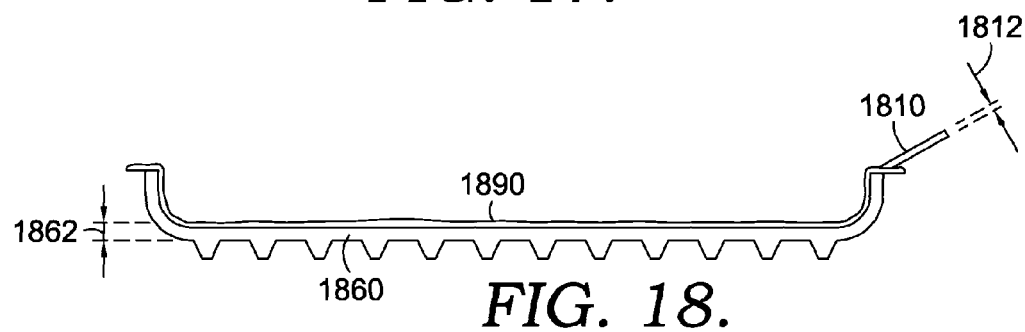

Referring now to FIG. 18, a side view of a rubber object 1860 with a tab 1810 extending therefrom is provided. The tab 1810 may extend from either the flash 1890 or the rubber object 1860. Once again, rubber object 1860 may possess flash 1890 corresponding to the junction of different portions of a mold. The base portion of rubber object 1860 may have a thickness 1862, while tab 1810 may have a thickness 1812. The thickness 1812 of tab 1810 may be, for example, one-tenth the thickness 1862 of the base portion of rubber object 1860.

Figure 19:
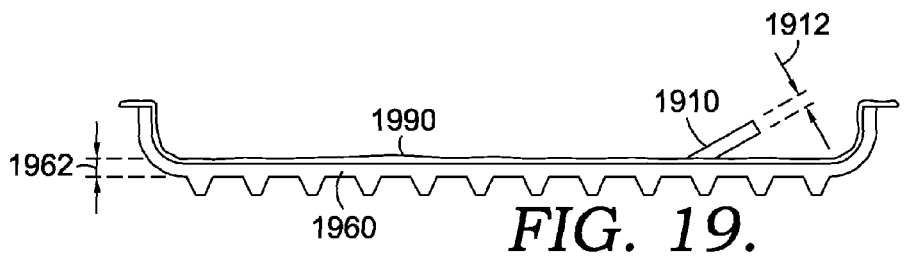

Referring now to FIG. 19, a side view of a rubber object 1960 having a tab 1910 is provided. In the example of FIG. 19, tab 1910 is positioned within the perimeter of rubber object 1960 and terminates within the perimeter of the rubber object 1960. Once again, rubber object 1960 possesses flash 1990 corresponding to the juncture of different portions of the mold used to form rubber object 1960. Tab 1910 may have a thickness 1912 that is a fraction of the thickness 1962 of base portion of rubber object 1960. For example, the ratio of the thickness 1912 of tab 1910 to the thickness 1962 of base portion of rubber object 1960 may be 1:10, 1:5, etc.

Figure 20:
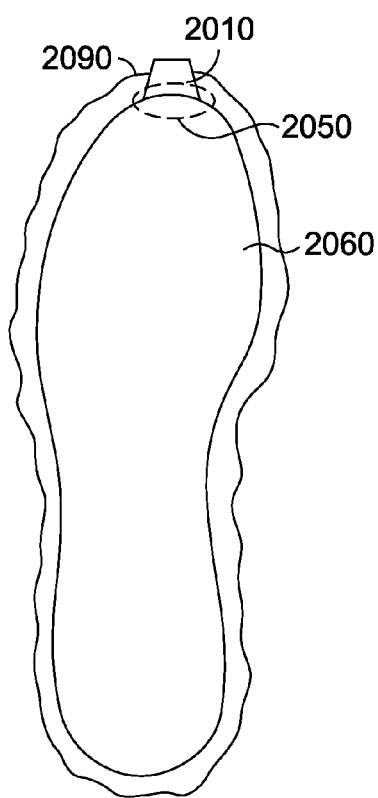

Referring now to FIG. 20, a top view of a rubber object 2060 similar to those shown from the side in FIG. 17 and/or FIG. 18 is illustrated. As shown in FIG. 20, a tab 2010 may extend from the base portion of a rubber object 2060 at a terminal end 2050 on the perimeter of the rubber object 2060. The example illustrated in FIG. 20 affectively positions tab 2010 at the junction of the flash 2090 and the rubber object 2060, thereby potentially permitting tab 2010 to be removed from the rubber object 2060 at the same time the flash 2090 is removed.

Figure 21:
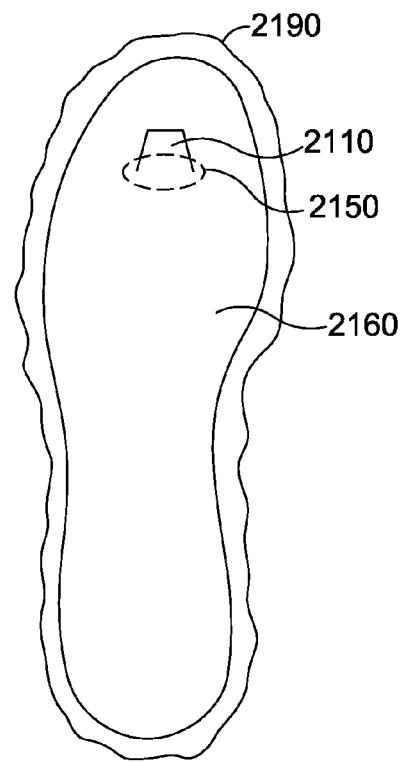

Referring now to FIG. 21, a top view of a rubber object, such as the rubber object illustrated in side view in FIG. 19, is provided. In the example of FIG. 21, tab 2110 extends from an interior location 2150 of the rubber object 2160. In the example of FIG. 21, tab 2110 is entirely contained within the perimeter of the rubber object 2160. If tab 2110 is to be removed from the rubber object 2160, the removal of flash 2190 may have to comprise a separate process.

Figure 22:
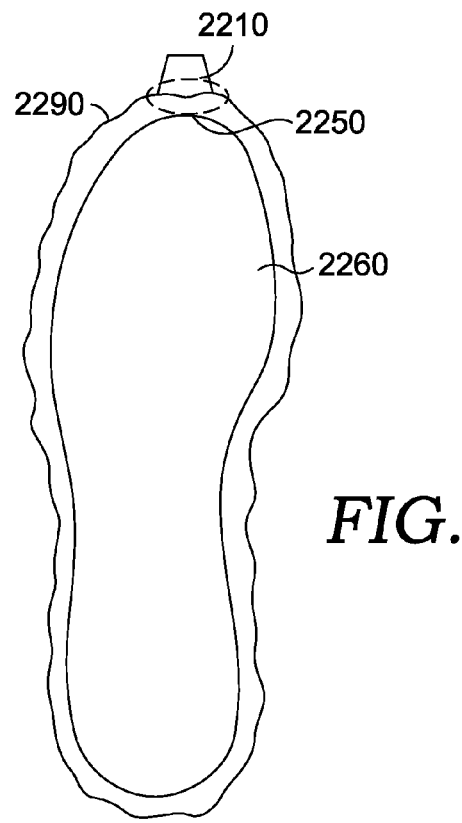

Referring now to FIG. 22, a top view of a rubber object 2260 similar to those shown from the side in FIG. 17 and/or FIG. 18 is provided. As shown in FIG. 22, a tab 2210 may extend from the flash 2290 at a terminal end 2250 of a rubber object 2260. Thus, in the example of FIG. 22, the tab 2210 is attached to the flash 2290 rather than the perimeter of the rubber object 2260. Attaching the tab to the flash can allow for a thicker tab that is easy to grip while maintaining a thin base that is easy to cut away from the rubber object 2260. The example illustrated in FIG. 22 affectively positions tab 2210 within flash 2290, thereby potentially permitting tab 2210 to be removed from the rubber object 2260 at the same time flash 2290 is removed.

Figure 23:
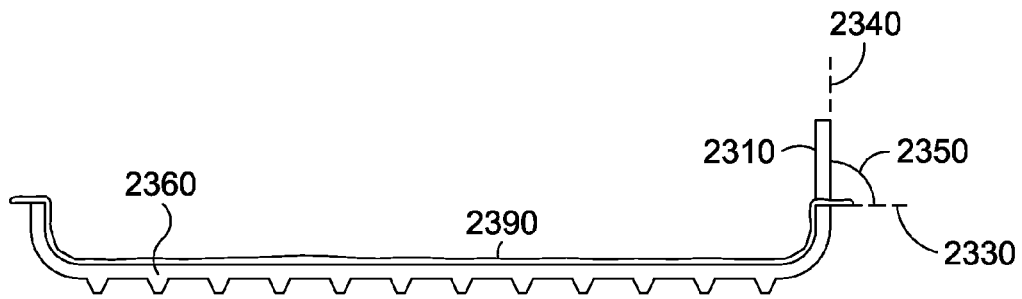

Referring now to FIG. 23, a side view of a rubber object 2360 with a tab 2310 is provided. In the example of FIG. 23, a first plane 2330 roughly parallel to the base portion of rubber object 2360 is shown. Tab 2310 extends along a second plane 2340 at an angle 2350 substantially perpendicular to first plane 2330. In the example of FIG. 23, tab 2310 may be formed in a mold top, such as mold top 115 illustrated and described above. Flash 2390 is shown on the perimeter of the rubber object 2360.

Figure 24:
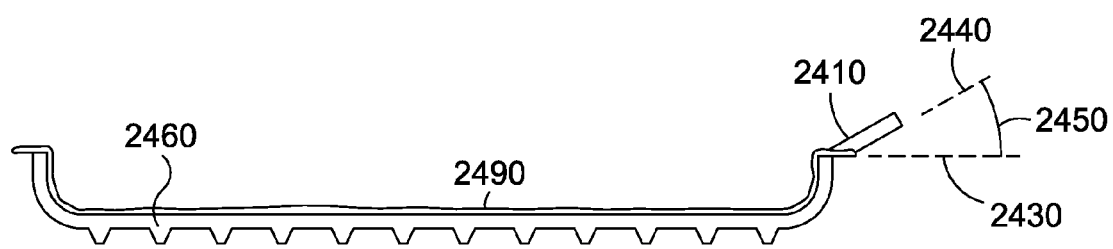

Referring now to FIG. 24, a side view of a rubber object 2460 with a tab 2410 is provided. A plane 2430 corresponding to rubber object 2460 is illustrated. Tab 2410 extends along a second plane 2440 at an angle 2450 with first plane 2430. In the example of FIG. 24, angle 2450 is acute. The actual measure of angle 2450 may vary based upon, for example, the limitations of a mold, the flowability of rubber used in accordance with aspects of the present invention, the limitations and/or needs of a gripping device, etc. A rubber object with a tab 2410 extending as illustrated in FIG. 24 at angle 2450 may be formed, for example, by providing for the formation of tab 2410 in a mold top. Flash 2490 is shown on the perimeter of the rubber object 2460.

Figure 25:
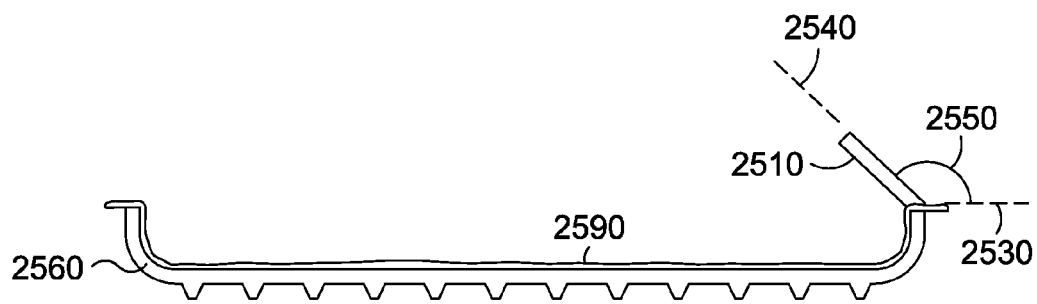

Referring now to FIG. 25, a side view of a rubber object 2560 with a tab 2510 is provided. A first plane 2530 is shown extending as defined by rubber object 2560. Tab 2510 extends along a plane 2540 at an obtuse angle 2550 with first plane 2530. The orientation of tab 2510 at an obtuse angle 2550 may facilitate the peeling of a rubber object 2560 out of a mold in some instances. A tab 2510 extending at an obtuse angle 2550 as illustrated in the example of FIG. 25 may be formed, for example, by providing an appropriate cavity within a mold top. Flash 2590 is shown on the perimeter of the rubber object 2560.

FIGS. 26-32 use a cut-away perspective to illustrate various exemplary configurations of molds that may be used to form rubber objects with tabs in accordance with aspects of the present invention. These illustrations are exemplary only, and other configurations and orientations of mold cavities are within the scope of the present invention. Further, while the present examples illustrate molds having only a mold bottom and a mold top, molds may be used that provide additional components to form a molded rubber object, such as a mold side, mold rear, or mold toe.

Figure 26:
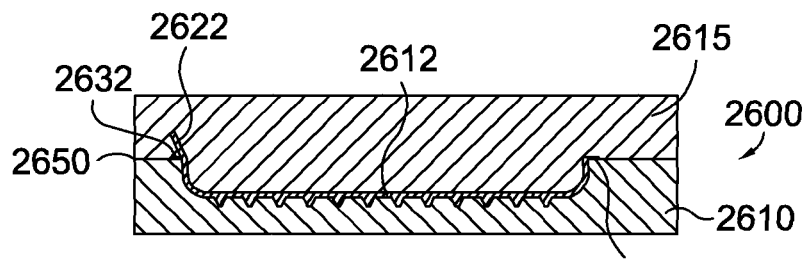
FIGS. 26-32 illustrate examples of molds that may be used to form tabs with various orientations and locations relative to a rubber object.

In the example of FIG. 26, a mold bottom 2610 meets with a mold top 2615 at a junction point 2650. Assembly 2600 may provide a cavity 2612 corresponding to the approximate size and shape of a desired final rubber object while a tab form 2622 extends from the cavity 2612 into the mold top 2615. The flash channel is visible at the left end 2632 and the right end 2634 of the flash channel.

Figure 27:
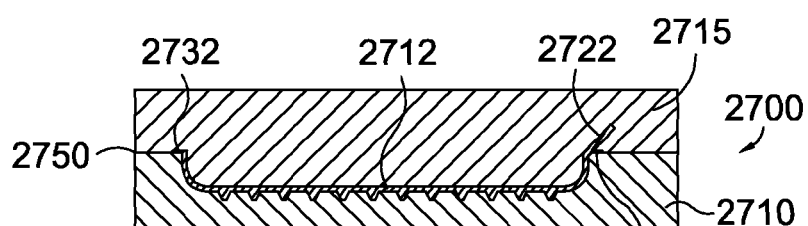

Referring now to FIG. 27, yet a further example of a mold assembly 2700 comprising a mold bottom 2710 and a mold top 2715 is illustrated. Junction point 2750 illustrates where mold bottom 2710 to mold top 2715 meet. A cavity 2712 may be defined substantially within mold bottom 2710, while a tab form 2722 may extend substantially, but not entirely, within mold top 2715. In the example illustrated in FIG. 27, a portion of tab form 2722 is located within mold bottom 2710, but this need not be the case. The example mold assembly 2700 illustrated in FIG. 27 may be used to form a rubber object having a tab extending at an acute angle relative to the rubber object. The flash channel is visible at the left end 2732 and the right end 2734 of the flash channel.

Figure 28:
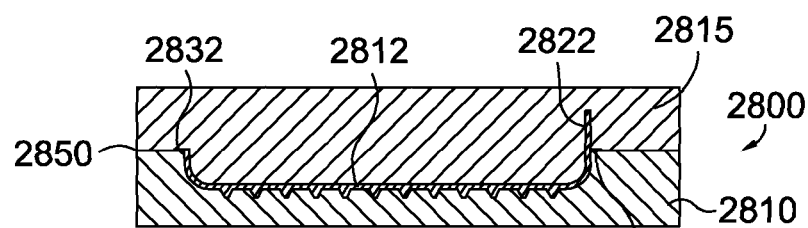

Referring now to FIG. 28, a mold assembly 2800 having a mold bottom 2810 and a mold top 2815 meet at a junction 2850 is illustrated. A cavity 2812 is contained within mold bottom 2810 while a tab form 2822 extends substantially perpendicular from cavity 2812 within mold top 2815. A mold such as the example illustrated in FIG. 28 may be used to form a molded rubber object having a tab extending substantially perpendicular to the molded rubber object. The flash channel is visible at the left end 2832 and the right end 2834 of the flash channel.

Figure 29:
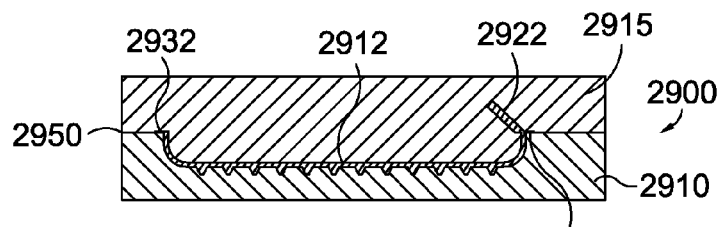

Referring now to FIG. 29, a mold assembly 2900 is illustrated. A mold bottom 2910 and a mold top 2915 meet at junction point 2950. A cavity 2912 may be defined within lower mold portion 2910. A tab form 2922 may extend at an obtuse angle from cavity 2912. A mold such as illustrated in the example of FIG. 29 may be used to form a rubber object with an obtuse tab as described above. The flash channel is visible at the left end 2932 and the right end 2934 of the flash channel.

Figure 30:
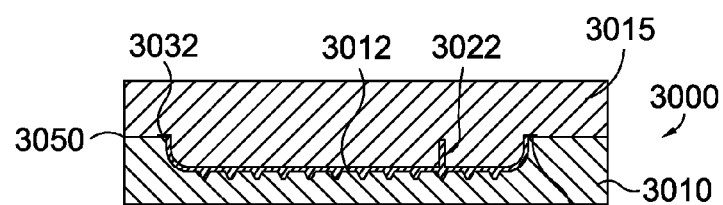

Referring now to FIG. 30, a mold assembly 3000 comprising a mold bottom 3010 and a mold top 3015 meeting at a junction 3050 is illustrated. In the example illustrated in FIG. 30, a cavity 3012 may be defined in the mold bottom 3010. A tab form 3022 may extend from the interior of the cavity 3012 to form a molded rubber object having a tab extending from the interior portion of the molded rubber object. In the example illustrated in FIG. 30, tab form 3022 extends in a substantially perpendicular fashion from cavity 3012. The flash channel is visible at the left end 3032 and the right end 3034 of the flash channel.

Figure 31:
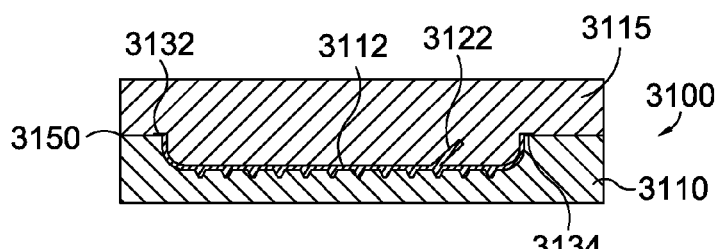

Referring now to FIG. 31, a mold assembly 3100 having a mold bottom 3110 and a mold top 3115 is illustrated. Mold bottom 3110 and mold top 3115 meet at junction 3150. A cavity 3112 may be defined within mold bottom 3110 and a tab form 3122 may extend at an acute angle from cavity 3112 within mold top 3115 to form a tab on a rubber object within the perimeter of the rubber object. The flash channel is visible at the left end 3132 and the right end 3134 of the flash channel.

Figure 32:
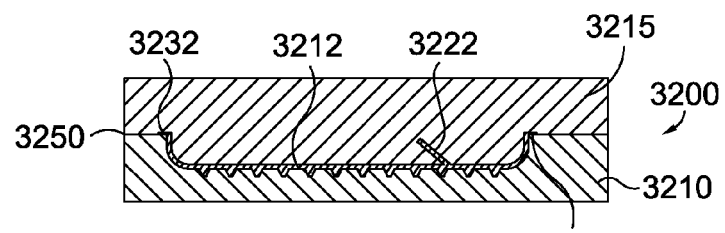

Referring now to FIG. 32, a mold assembly 3200 comprising a lower mold portion 3210 and an upper mold portion 3215 is illustrated. Lower mold portion 3210 and upper mold portion 3215 meet at junction 3250. A cavity 3212 may be defined within mold bottom 3210, while a tab form 3222 may extend into mold top 3215 at what will be an obtuse angle on a formed molded object. The flash channel is visible at the left end 3232 and the right end 3234 of the flash channel.

Figure 33:
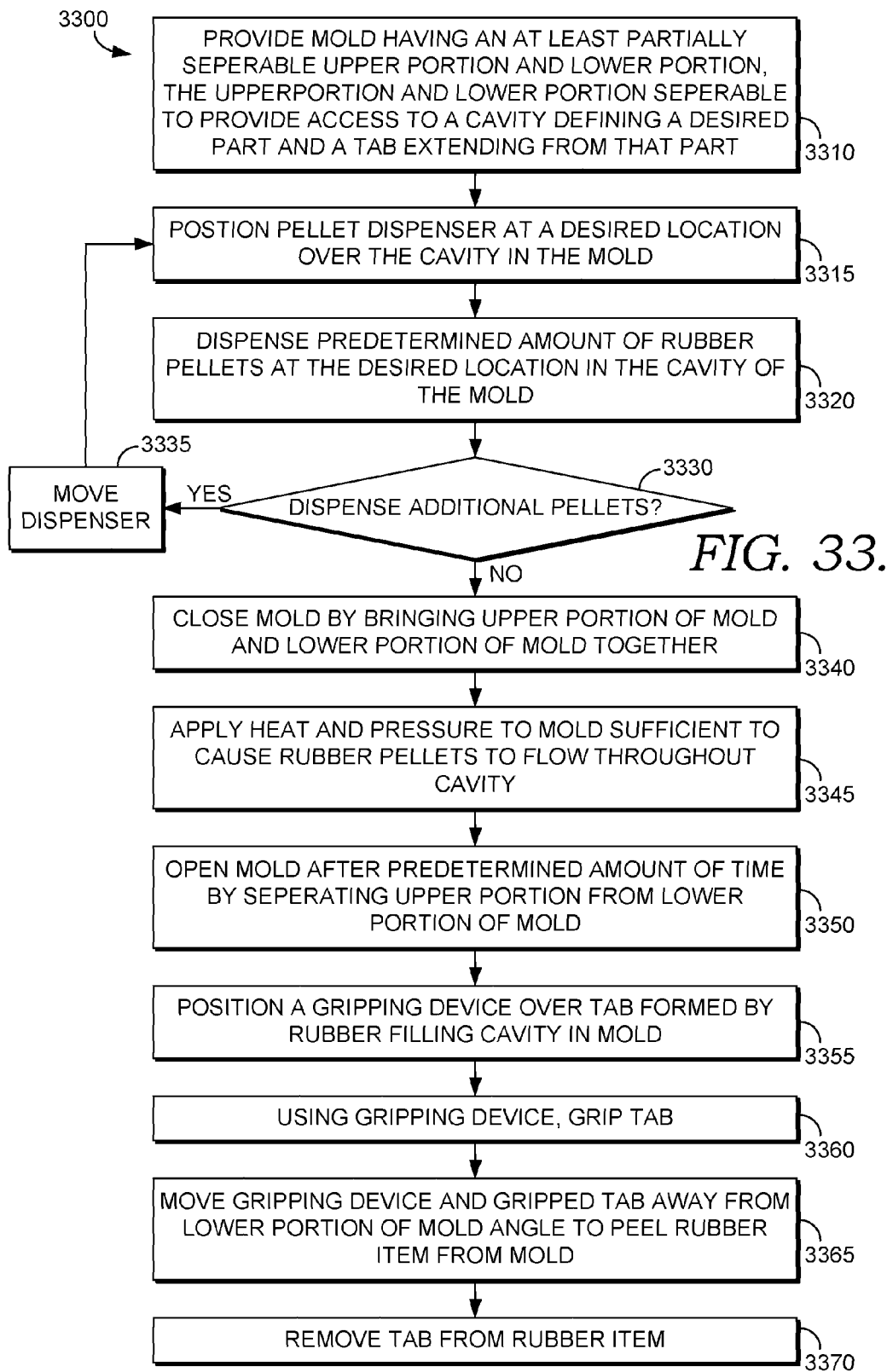
FIG. 33 illustrates an example of a method in accordance with aspects of the present invention.

Referring now to FIG. 33, an example method 3300 in accordance with aspects of the present invention for molding and de-molding rubber objects is illustrated. In step 3310 a mold may be provided. The mold provided in step 3310 may have an at least partially separable mold top and mold bottom to permit access to a cavity within the mold. The cavity accessible by at least partially separating the mold top from the mold bottom may define a desired rubber part and may further define a tab extending from that part. The cavity and associated tab form may be provided in one or more portion of a mold i.e., may be in a mold top, a mold bottom, and/or both a top and a bottom of a mold. The tab extending from the defined rubber part may extend at any angle relative to the part and may have a thickness less than the thickness of the part itself. A tab extending from a part, as defined by a cavity provided in a mold provided in step 3310, may have a thickness of less than 20%, or even less than 10%, of the thickness of the rubber part defined. Alternatively, the tab may have a thickness equal to the rubber part. The tab may have a thin portion at a joint between the tab's base and the rubber part. The thin portion is included to facilitate separating of the rubber part and the tab.

In step 3315, a rubber pellet dispenser may be positioned at a desired location over the cavity in the mold, and/or the mold may be positioned at a desired location relative to the mold. The rubber pellet dispenser may have previously received rubber pellets to dispense. An X-Y table, a six-axis robotic arm or any other positioning device may be used to position the rubber pellet dispenser in step 3315. Alternatively, the mold pellets may be distributed through the cavity, rather than at discrete locations.

In step 3320, a predetermined amount of rubber pellets may be dispensed at the desired location(s) in the cavity of the mold. For example, a first predetermined amount of rubber pellets may be dispensed at a first location within the cavity. The predetermined amount of rubber pellets dispensed in step 3320 may be determined using weight, volume, elapsed dispensing time, or any other means. In one aspect, it can be preferable to dispense pellets according to their weight. The amount of pellets dispensed in step 3320 may be selected based upon the size of a cavity to be filled, the portion of a cavity to be filled, the physical properties of the rubber pellets, etc. Again, the pellets may alternatively be distributed evenly through the cavity rather at discrete locations.

In step 3330, a computing device or other system may determine whether additional rubber pellets should be dispensed. If the conclusion of step 3330 is that additional pellets need to be dispensed, method 3300 may proceed to step 3335 of moving the dispenser and/or mold. If need be, additional rubber pellets may be received by the dispenser as part of step 3335. Method 3300 may thereafter return to step 3315 of positioning the rubber pellet dispenser at a desired location, in this second iteration, for example, at a second location over the cavity in the mold. Subsequently, an additional predetermined amount of rubber pellets may be dispensed once again in a repetition of step 3320, for example a second predetermined amount of rubber pellets. The amount of pellets dispensed as the predetermined amount of rubber pellets may vary in different iterations of step 3320 based upon the location at which those pellets are being dispensed, the object to be formed by method 3300, etc.

If the conclusion of step 3330 is that no additional pellets need be dispensed, method 3300 may proceed to step 3340 of closing the mold by, for example, securing the mold top to the mold bottom. Step 3340 may comprise mating a mold top and a mold bottom, joining the mold top to a mold bottom using a latch and/or latches, by inserting a mold within a mold opening in a heat press, or through any other means.

In step 3345, heat and pressure may be applied to the mold sufficient to cause the rubber pellets within the mold to spread throughout the cavity. Step 3345 may cause the pellets to spread to fill the portions of the cavity corresponding to the desired part and to the desired tab extending from that part.

After a predetermined amount of time and/or when desired conditions have been met, the mold may be opened in step 3350. Step 3350 may comprise, for example, removing the mold from a heat press, unlatching a latch securing a mold closed, rotating a mold top of the mold to an open position using a hinge, etc.

In step 3355, a gripping device may be positioned over the tab formed by the rubber filling the cavity in the mold. Step 3355 may be performed, for example, using a six-axis robotic arm or other device capable of performing and actuating a gripping device in three dimensions. Step 3355 (of positioning a gripping device) and step 3315 (of positioning a dispenser) may use the same or different mechanical systems.

In step 3360, the tab may be gripped by the gripping device. Step 3360 may comprise, for example, actuating one or more sides of a gripping device to close over opposing sides of a tab formed by the rubber filling the cavity in the mold. The surfaces of the gripping device may possess textures to engage the rubber of the tab, and the gripping device may provide sufficient pressure for to the rubber of the tab to prevent the tab from escaping the gripping device while the gripping device is engaged to grip the tab.

In step 3365, the gripping device and the gripped tab may be moved away from the mold bottom at a non-perpendicular angle relative to the mold bottom to peel the rubber object from the mold. The angle and force with which step 3365 is performed may vary based upon the size and/or shape of a rubber object, the intricacy of any pattern formed in the rubber object, the tackiness of the rubber object to the surface of the cavity within a mold, etc. Step 3365 may be performed, for example, by moving the terminal end of a six-axis robotic arm bearing the gripping device at a desired angle and with a desired force relative to the mold bottom to extract the molded rubber object from the cavity of the mold.

In step 3370 the tab may be optionally removed from the rubber object. In some examples of the present invention, the tab may be useful in forming a finished product incorporating the rubber object, or may at least not be detrimental to the quality or performance of the finished object incorporating the molded rubber object. However, if optional step 3370 is performed, it may utilize any cutting device, such as a blade, scissors, or any other cutting mechanism, to sever a tab from a rubber object. Step 3370 may also be performed as part of a general de-flashing process that would otherwise be employed to remove flashing from a molded rubber object. Such de-flashing processes may involve the use of abrasives, the tumbling of the molded rubber object within a chamber, or other mechanisms and/or processes.

Figure 34:
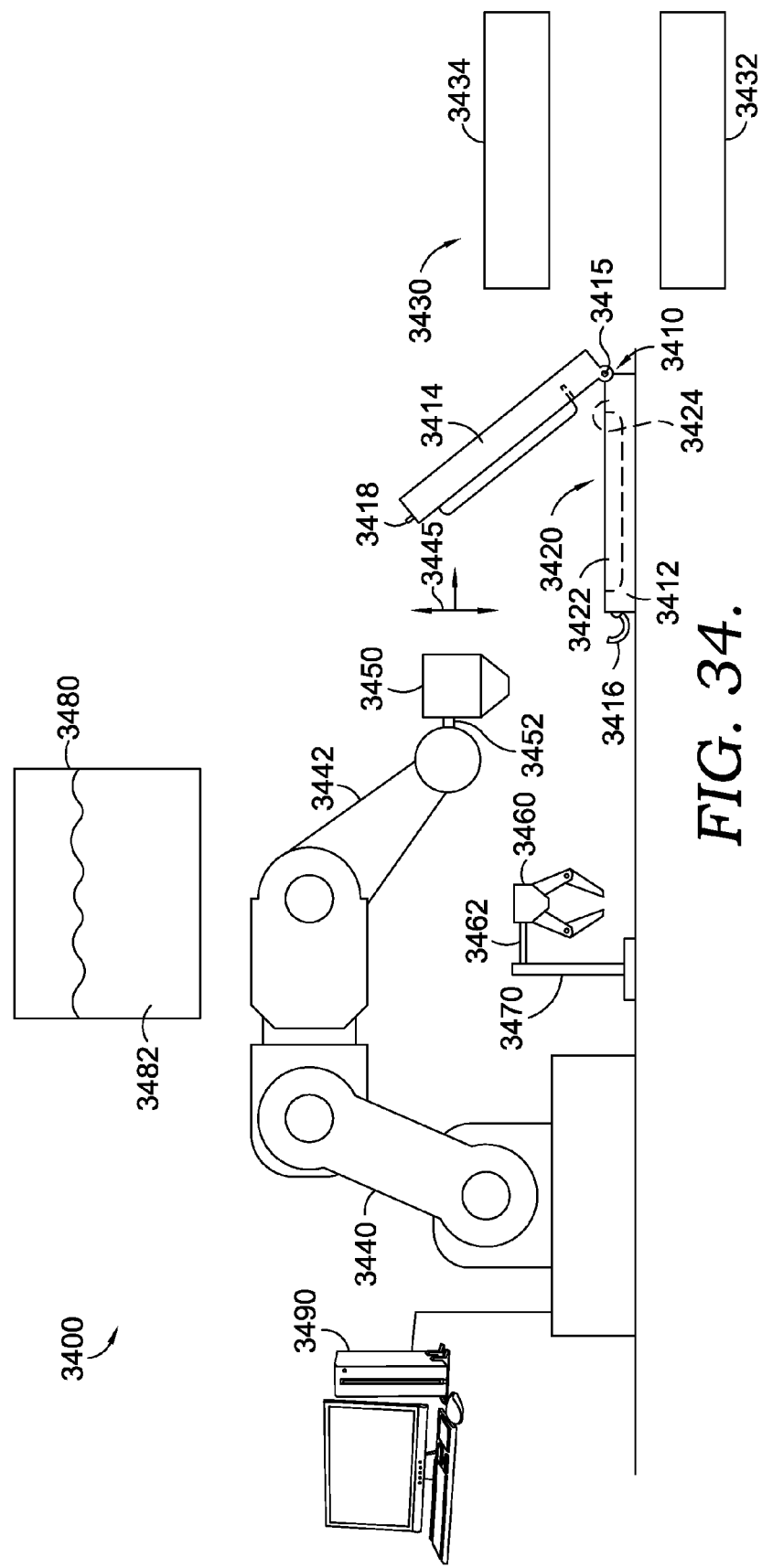
FIG. 34 illustrates a schematic diagram of an example system in accordance with aspects of the present invention.

Referring now to FIG. 34, a side view of a further example of a molding system 3400 is provided. System 3400 and system 100 are only two examples of systems in accordance with aspects of the present invention, and elements of the two may be inter-changed, added, and/or omitted, in other systems that are in accordance with aspects of the present invention. A mold 3410 may comprise a mold bottom 3412 and a mold top 3414, which may be connected by, for example, a hinge 3415. A latch 3416 on mold bottom 3412 may detachably engage a ridge 3418 on mold top 3414 to serve as a closure mechanism, although any type of closure mechanism may be used. Any of a variety of molds may be used for mold 3410, and the presence, location, configuration, and/or number of components such as hinge 3415, latch 3416, and ridge 3418 may vary. For example, the hinge 3415, latch 3416, and/or ridge 3418 may be omitted entirely or may be replaced with other structures. While in an open position, mold 3410 may expose at least a portion of a cavity 3420, and while in a closed position, mold 3410 may enclose the cavity 3420.

Cavity 3420 may be accessible by at least partially separating mold top 3414 from mold bottom 3412 of mold 3410. Cavity 3420 may comprise a part portion 3422 corresponding to the size, shape, and other details corresponding to the form of a desired rubber part. Cavity 3420 may further comprise a tab form 3424 extending from the part portion 3422 of cavity 3420 into mold top 3414. Accordingly, a sufficient amount of rubber within cavity 3420 treated with sufficient heat and/or pressure to spread through the cavity 3420 will fill both the part portion 3422 and tab form 3424. Heat and pressure may be provided, for example, using a heat press 3430, which may comprise a lower portion 3432 and an upper portion 3434 to apply heat and/or pressure to the mold bottom 3412 and mold top 3414 of mold 3410, respectively.

While a variety of mechanisms may be used to position a dispenser 3450 and/or a gripping device 3460 within system 3400, in the present example a six-axis robotic arm 3440 is illustrated. Arm 3440 may provide a terminal end 3442 that may detachably affix to tools such as a dispenser 3450 and a gripping device 3460. For example, a connector 3452 may join dispenser 3450 to the terminal end 3442 of arm 3440. Similarly, gripping device 3460 may possess a connector 3462 that may be used to join gripping device 3460 to terminal end 3442 of arm 3440 when needed. Dispenser 3450 and gripping device 3460 may be interchanged as needed at terminal end 3442 of arm 3440 and, when not in use, may be retained on a rack 3470 accessible by arm 3440. While a single arm 3440 with interchangeable tools are illustrated in the example of FIG. 34, multiple arms, potentially with tools permanently or semi-permanently affixed, may be used in aspects of the present invention.

A dispenser 3450 may dispense predetermined amounts of rubber pellets into the cavity 3420. The dispenser 3450 may be positionable, for example using arm 3440, to dispense a first predetermined amount of rubber pellets at a first location within the cavity 3420 and to dispense a second predetermined amount of rubber pellets at a second location within the cavity. Alternatively, the rubber pellets may be spread through the cavity 3420.

The selection of a tool for terminal end 3442 of arm 3440, the positioning of that tool, the status of mold 3410, the use of heat press 3430, and any other molding parameters may be controlled by a computing device 3490. For example, computing device 3490 may be operable to cause arm 3440 to position an attached dispenser 3450 at a rubber pellet reservoir 3480 to receive rubber pellets 3482. Computing device 3490 may thereafter cause arm 3440 to position dispenser 3450 over at least one location of cavity 3420 and dispense predetermined amounts of rubber pellets at that location or locations. After dispenser 3450 has dispensed a desired amount of rubber pellets at a desired location or locations, computing device 3490 may close mold 3410 and secure latch 3416. Thereafter, computing device 3490 may cause mold 3410 to be positioned within heat press 3430 such that heat and/or pressure may be applied to mold 3410. While heat press 3430 may serve as a heat source, any type of heat source that heats mold 3410 to at least a temperature higher than the temperature at which the rubber will be vulcanized. For example, ovens, induction heaters, resistive heaters, and the like may be used as heat sources. After a predetermined amount of time has elapsed, computing device may cause mold 3410 to at least partially separate to permit a molded rubber object contained within cavity 3420 to be removed. In one aspect, the predetermined amount of time is the desired vulcanization time.

In order to remove a rubber object from cavity 3420, computing device 3490 may cause the terminal end 3442 of arm 3440 to move in three dimensions, as indicated by axes 3445, to return dispenser 3450 to rack 3470 and to attach to gripping device 3460. Computing device 3490 may thereafter position gripping device 3460 over the tab of the rubber object within cavity 3420 formed by tab form 3424, to grip the tab, and to extract the rubber object from the cavity 3420, as further described below.

Figure 35:
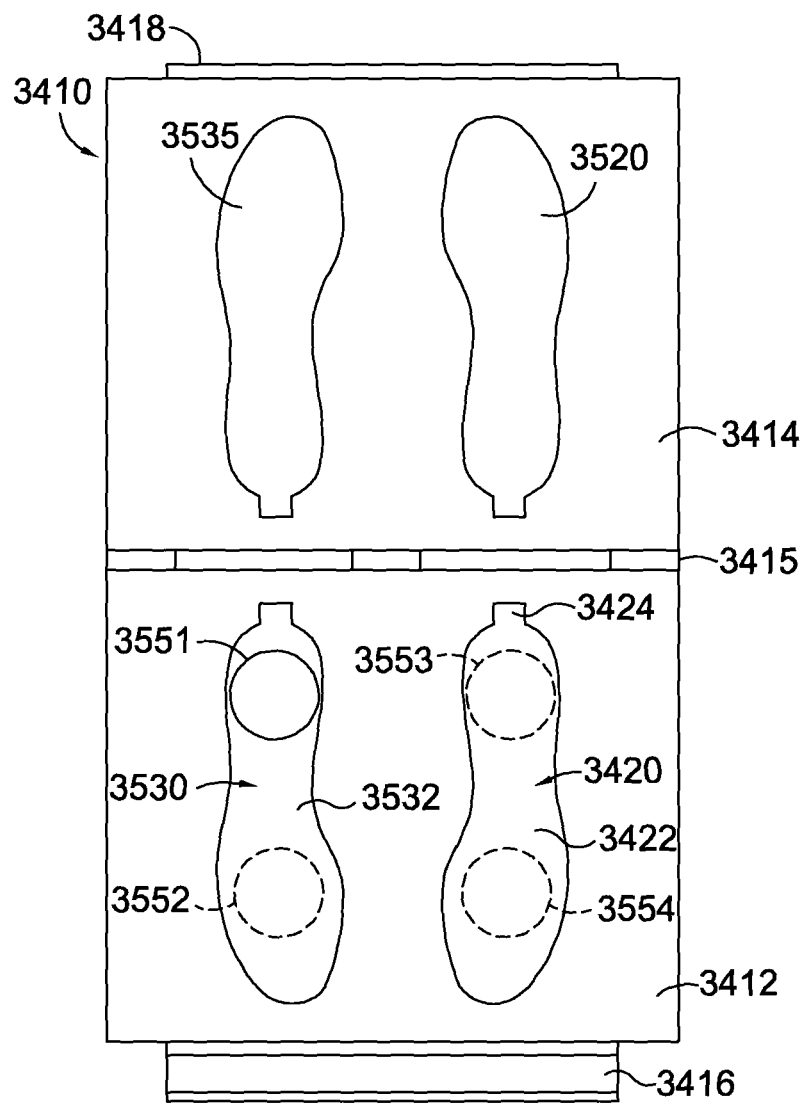
FIG. 35 illustrates a top view of an example of an open mold suitable for use in accordance with aspects of the present invention.

Referring now to FIG. 35, a top view of an example of an open mold 3410 suitable for use in accordance with aspects of the present invention is illustrated. In the example of FIG. 35, mold 3410 has a first cavity 3420 and a second cavity 3530. First cavity 3420 and second cavity 3530 may correspond, for example, to a left shoe outsole and a right shoe outsole, but may comprise any other type of part or parts of other articles in addition to shoes. While two cavities 3420, 3530 are illustrated in the example of FIG. 35, any number of cavities may be used in a single mold in accordance with aspects of the present invention. Optionally, mold top 3414 of mold 3410 may provide a further cavity 3520 corresponding to cavity 3420 in mold bottom 3412 and a further cavity 3535 corresponding to the second cavity 3530, although such cavities 3520, 3535 in mold top 3414 need not be provided.

As also shown in FIG. 35, a first position 3551 may have received a predetermined amount of rubber pellets from dispenser 3450 (illustrated in FIG. 34). A second location 3552, a third location 3553, and a fourth location 3554 may further receive predetermined amounts of rubber pellets from dispenser 3450 after dispenser 3450 has been moved by arm 3440. The number, location, and position of locations within a cavity (or cavities) at which a dispenser 3450 dispenses a predetermined amount of rubber pellets may vary based upon the shape, size, and/or configuration of a cavity, the size, amount, tackiness, or other properties of the rubber pellets dispensed, or for any other reason. In one aspect, the pellets are distributed throughout the cavity, rather than in discrete locations.

Figure 36:
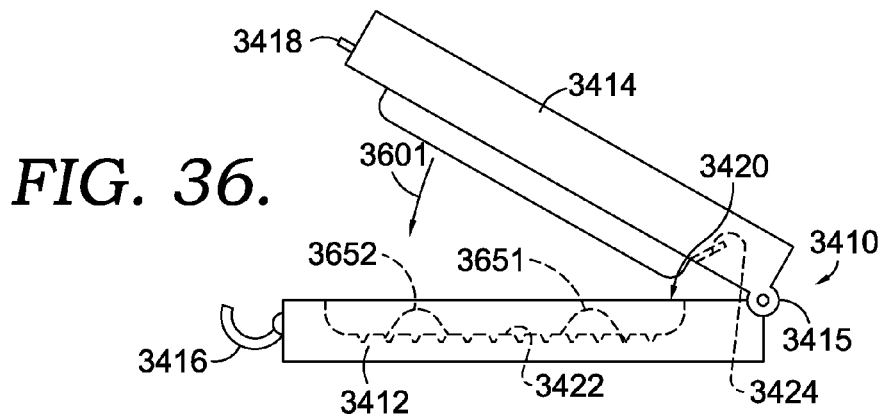
FIG. 36 illustrates a side view of an example mold suitable for use in accordance with aspects of the present invention.

Referring now to FIG. 36, an example mold 3410 has received a first predetermined amount of rubber pellets 3651 and a second predetermined amount of rubber pellets 3652 at a first location and a second location within a cavity 3420.

The amounts and locations of rubber pellets 3651, 3652 illustrated in FIG. 36 are for exemplary purposes only, and may be varied from what is shown relative to the size of cavity 3420. As shown in the example of FIG. 36, mold top 3414 of the mold 3410 is being closed as indicated by arrow 3601 to enclose the dispensed rubber pellets 3651, 3652 within cavity 3420 of a closed mold 3410. In the present example of FIG. 36, the mold top 3414 will engage the rubber pellets 3651, 3652 as mold 3410 is closed to facilitate the distribution of rubber pellets within cavity 3420 of mold 3410.

Figure 37:
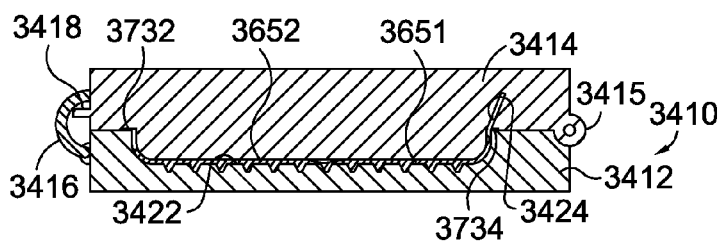
FIG. 37 illustrates a side view of an example of a closed mold suitable for use in accordance with aspects of the present invention.

Referring now to FIG. 37, a cross-section view of the mold 3410 is provided. The mold 3410 has been closed and secured using latch 3416. In the example of FIG. 37, the first predetermined amount of rubber pellets 3651 and the second predetermined amount of rubber pellets 3652 have been partially distributed within cavity 3420. The flash channel is visible at the left end 3732 and the right end 3734 of the flash channel.

Figure 38:
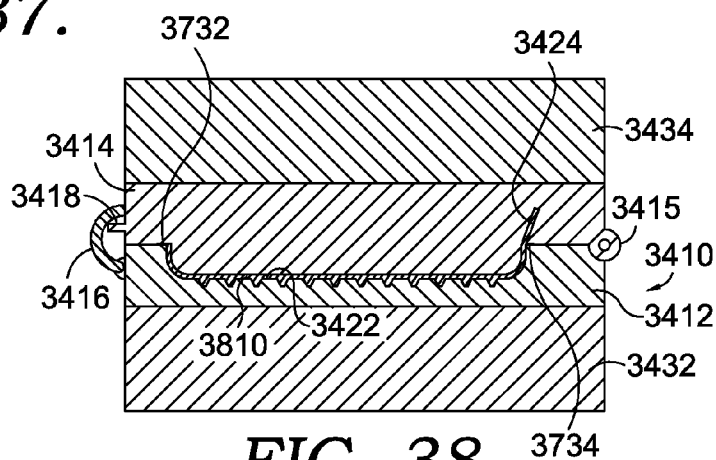
FIG. 38 illustrates a side view of an example of a mold suitable for use in accordance with aspects of the present invention while heat and pressure is applied to the mold.

Referring now to FIG. 38, a cross-section view of the mold 3410 and heat press is provided. An example heat press 3430 having a lower portion 3432 and an upper portion 3434 has been used to apply heat and pressure to the example mold 3410. The heat and pressure applied to mold 3410 is sufficient to cause the rubber pellets to melt and spread to form a rubber object 3810 that substantially fills cavity 3420, both the part portion 3422 and the tab form 3424. The heat and pressure can also be sufficient for vulcanization.

Figure 39:
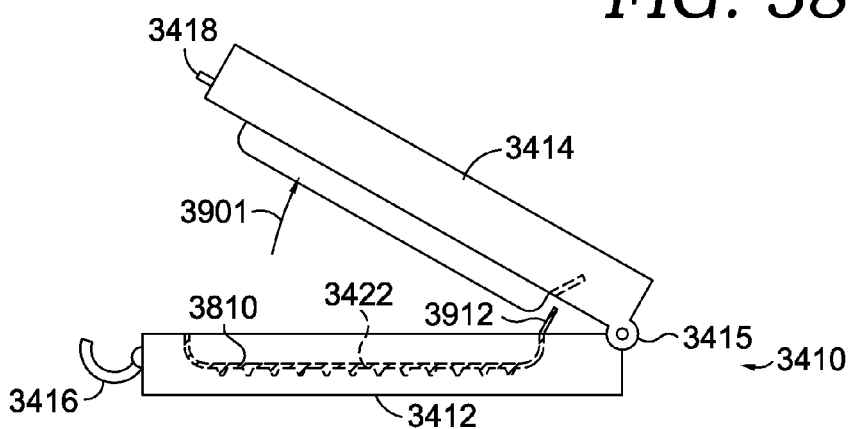
FIG. 39 illustrates a side view of an example of a mold suitable for use in accordance with aspects of the present invention being opened.

Referring now to FIG. 39, a side view of the mold 3410 is provided. After a predetermined amount of time, for example, sufficient time to permit rubber object 3810 to solidify, mold 3410 may be opened as indicated by arrow 3901. Mold 3410 may be opened to permit access to the cavity 3420 for de-molding using a gripping device 3460. A gripping device 3460 may grip the tab formed in a rubber object after the heat source heats the mold and the mold has been moved to an open position. The gripping device may remove the rubber object by exerting a force on the rubber object through the tab 3924 to remove the rubber object from the cavity.

Figure 40:
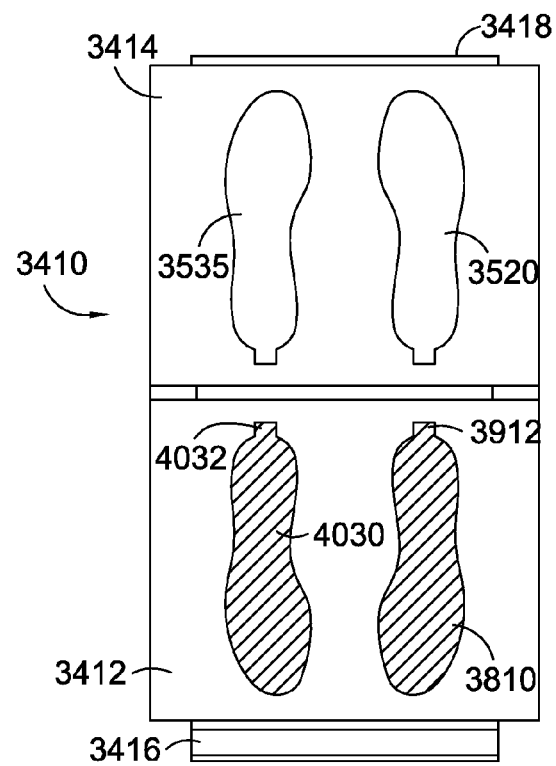
FIG. 40 illustrates a top view of an example of an open mold suitable for use in accordance with aspects of the present invention.

Referring now to FIG. 40, a top view of the mold 3410 is provided. The opened mold 3410 is shown to provide access to a first rubber object 3810 and to a second rubber object 4030. Tab 3912 extends from the first rubber object 3810 and tab 4032 extends from the second rubber object 4030.

Figure 41:
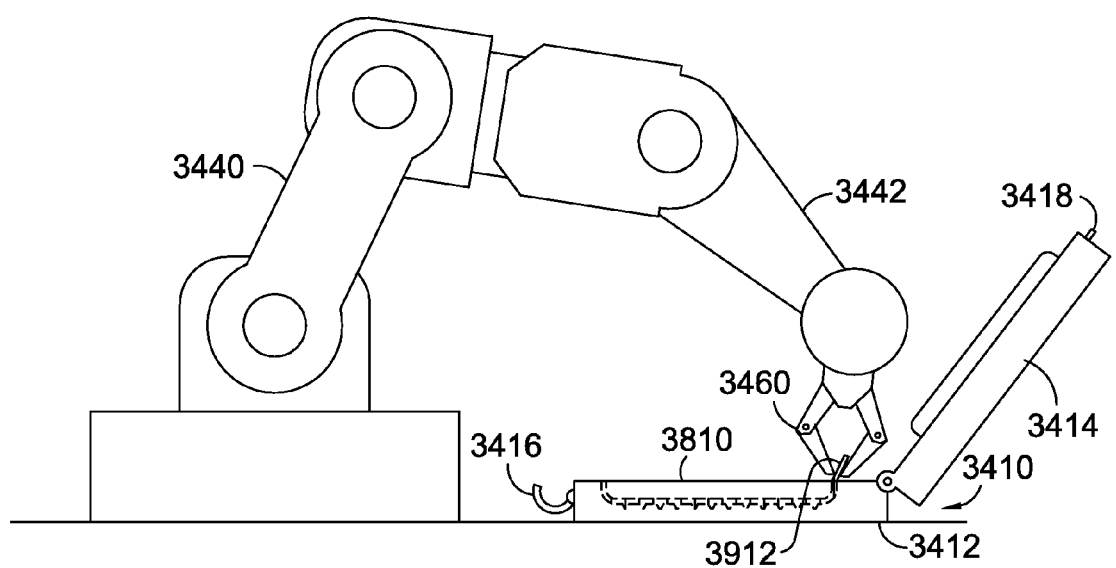
FIG. 41 illustrates an example of a gripping device positioned to remove a rubber object from a mold in accordance with aspects of the present invention.

Referring now to FIG. 41, an example gripping device 3460 has been attached to the terminal end 3442 of arm 3440. Arm 3440 has positioned gripping device 3460 substantially over a tab 3912 formed in molded rubber object 3810 by the tab form 3424 of the part portion 3422 within mold 3410.

Figure 42:
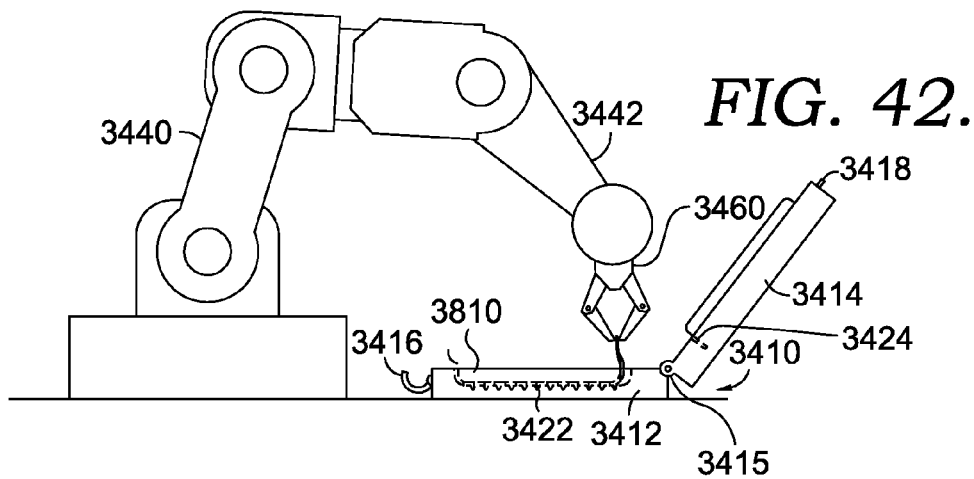
FIG. 42 illustrates an example of a gripping device removing a rubber object from a mold in accordance with aspects of the present invention.

Referring now to FIG. 42, the example gripping device 3460 has been closed to grip tab 3912 extending from molded rubber object 3810 within part portion 3422 of mold bottom 3412. As shown in the example of FIG. 42, arm 3440 has begun to lift terminal end 3442 and gripping device 3460 away from mold bottom 3412 and, along with it, tab 3912.

Figure 43:
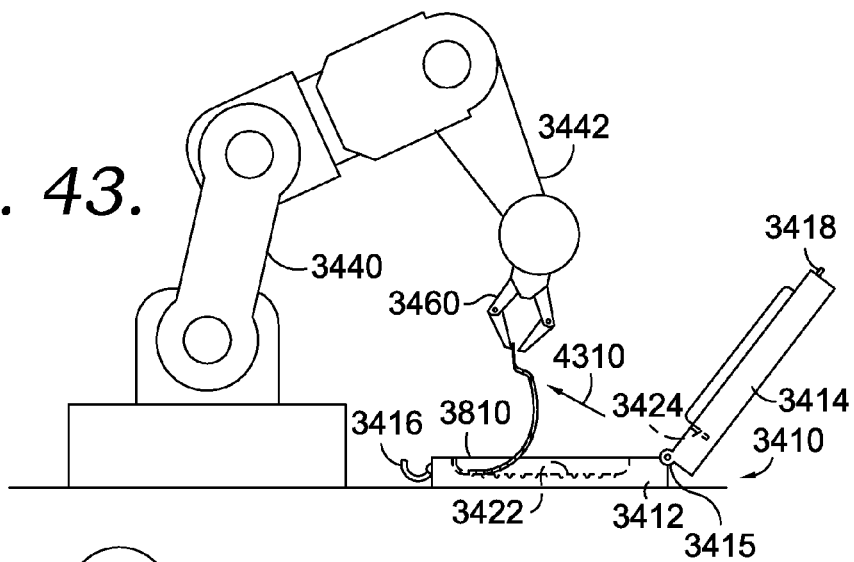
FIG. 43 illustrates an example of a gripping device removing a rubber object from a mold in accordance with aspects of the present invention.

Referring now to FIG. 43, the example gripping device 3460 and terminal end 3442 of arm 3440 have moved in a direction 4310 that is neither perpendicular to nor parallel to mold bottom 3412. As a result of the motion 4310 of gripping device 3460 secured to tab 3912 of rubber object 3810, rubber object 3810 has been partially separated from part portion 3422.

Figure 44:
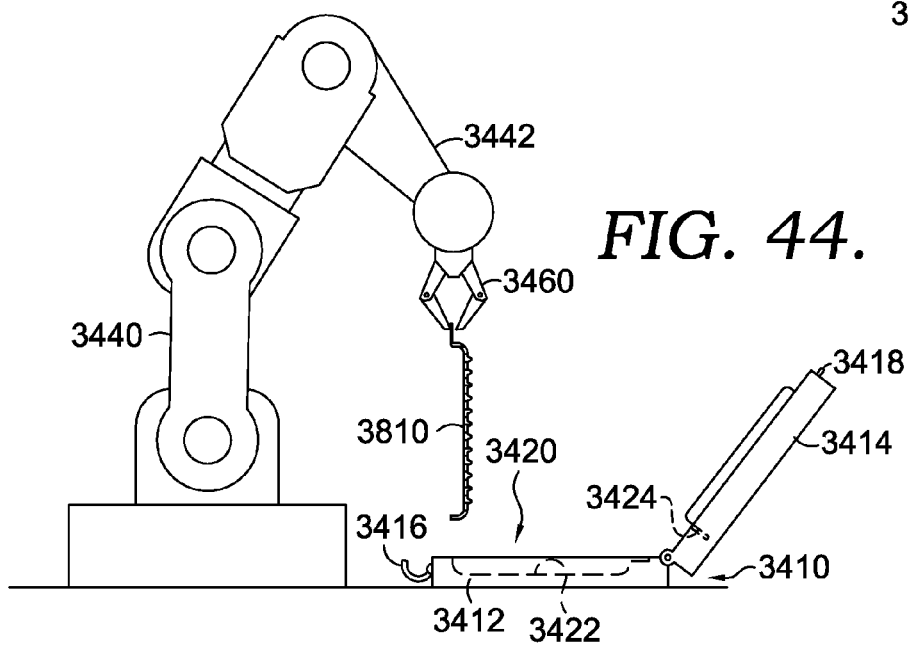
FIG. 44 illustrates an example of a rubber object that has been removed from a mold in accordance with aspects of the present invention by a gripping device.

Referring now to FIG. 44, an example molded rubber object 3810 has been completely removed from part portion 3422 of mold 3410. As illustrated in FIG. 44, cavity 3420, both part portion 3422 and tab form 3424, has been emptied of rubber object 3810. Mold 3410 and cavity 3420 may be cleaned or otherwise processed for additional molding operations, if desired.

Figure 45:
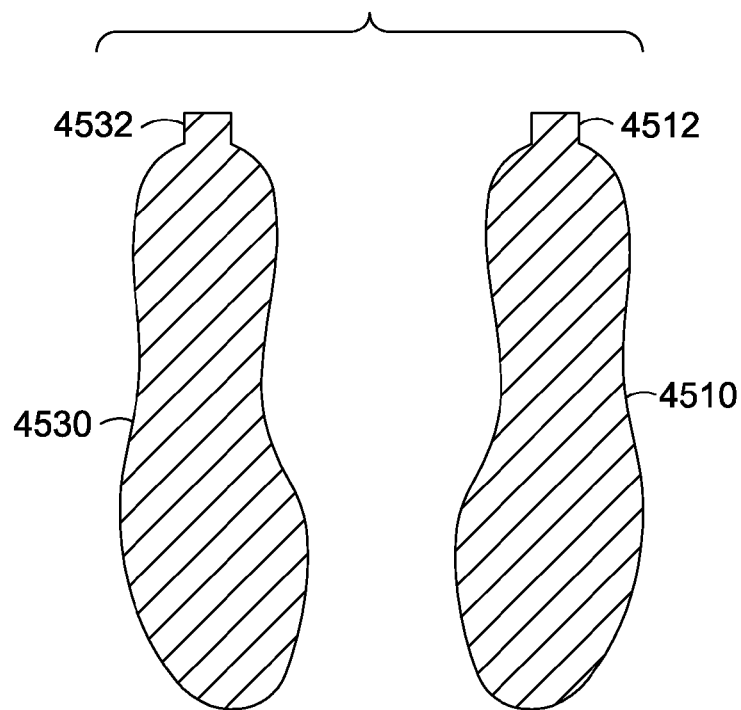
FIG. 45 illustrates examples of rubber objects after they have been removed from a mold in accordance with aspects of the present invention.

Referring now to FIG. 45, a pair of rubber objects comprising a first rubber object 4510 having a tab 4512 and a second rubber object 4530 having a tab 4532 are illustrated. While any number of rubber objects may be formed in accordance with aspects of the present invention, the examples of FIG. 45 are a left shoe outsole and a right shoe outsole.

Figure 46:
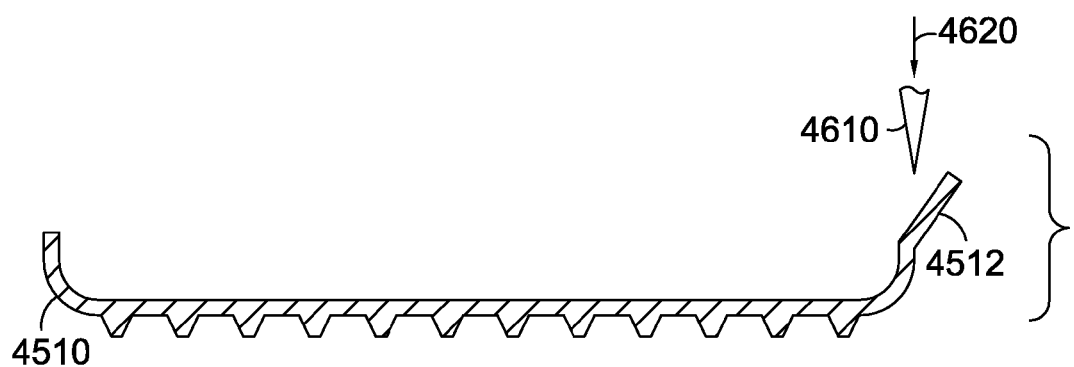
FIG. 46 illustrates an example of the removal of a tab from a rubber object in accordance with aspects of the present invention.

Referring now to FIG. 46, an example trimming device 4610 is shown. Trimming device 4610 may be moved as indicated by arrow 4620 to sever tab 4612 from rubber object 4510. In the example shown in FIG. 46, trimming device 4610 is an actuated blade, but other mechanisms may be used to remove a tab from a rubber object in accordance with the present invention. For example, cutting dies, reciprocating blades, scissors, abrasive de-flashing systems, or other mechanical systems may be used to remove a tab, such as tab 4512, from a rubber object such as molded rubber object 4510. Any trimming device that removes a tab 4512 from a rubber object 4510 after the rubber object 4510 is removed from a cavity may be used.

Figure 47:
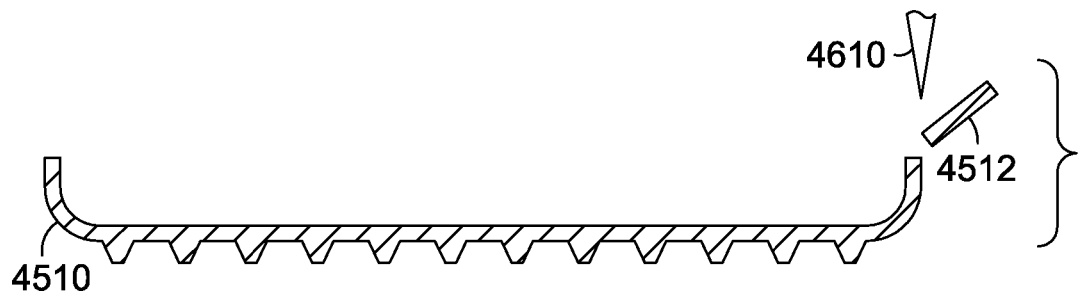
FIG. 47 illustrates an example of a rubber object after a tab has been removed from it in accordance with aspects of the present invention.

Referring now to FIG. 47, the example trimming device 4610 has removed tab 4512 from molded rubber object 4510. In some examples, a tab such as tab 4512 may not need to be removed from a rubber object such as molded rubber object 4510 prior to incorporating the molded rubber object into a product, such as a shoe, but in the present example the tab 4512 has been removed using trimming device 4610.

Figure 48:
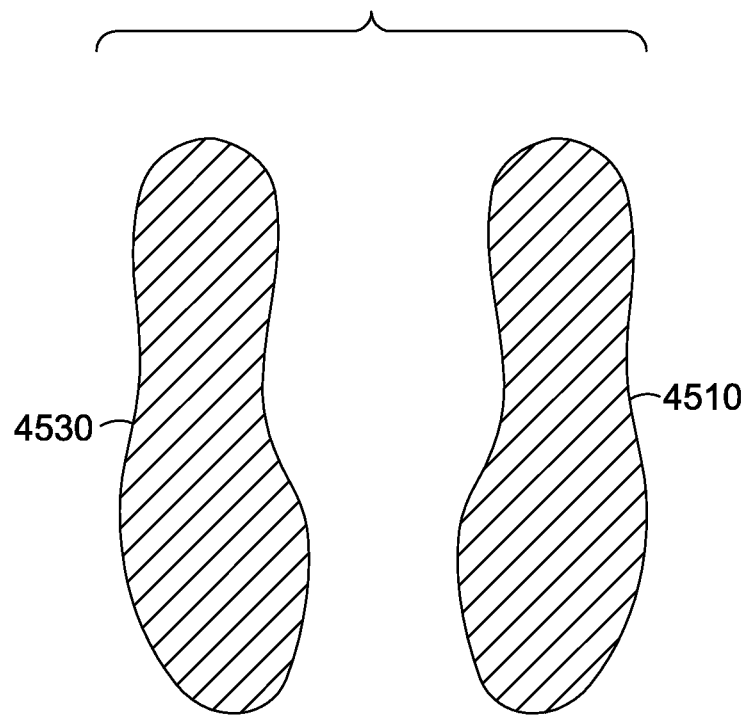
FIG. 48 illustrates examples of rubber objects after tabs have been removed from them in accordance with aspects of the present invention.

The result of removing tabs 4512, 4532 from the first rubber object 4510 and the second rubber object 4530 are illustrated in the example of FIG. 48. The removed tabs 4512, 4532 may be recycled or disposed. The first molded rubber object 4510 and the second molded rubber object 4530, as well as any additional molded rubber objects, may be incorporated into a desired product. For example, first molded rubber object 4510 may be affixed to a mid-sole structure, a shoe upper, or other shoe components as part of a shoe fabrication process.

Referring now to FIG. 49, an example arm 3440 with a terminal end 3442 is illustrated with a rack 3470 retaining a dispenser 3450 with a connector 3452 and a gripping device 3460 with a connector 3462. As shown in FIG. 49, arm 3440 may rotate 4910 to bring terminal end 3442 to rack 3470 to engage a tool, such as dispenser 3450 and/or gripping device 3460. Additional and/or different tools may be retained by rack 3470 or any similar mechanism for use by arm 3440 under the guidance of computing device 3490 to execute methods in accordance with aspects of the present invention. For example, tools may be provided to clean a mold 3410 cavity 3420; to open, close, or otherwise move a mold 3410; to exchange molds 3410 (for example to change for a different model or size of molded rubber objects); or for any other type of processing to form molded rubber parts in accordance with aspects of the present invention.

Aspects of the present invention also provide methods for forming molded rubber objects. A method may involve: dispensing at least two predetermined amounts of rubber pellets at least two discrete locations within the cavity of a mold bottom; closing the mold by affixing an mold top to a mold bottom, the mold top contacting the at least two predetermined amounts of rubber pellets when affixed to the mold bottom; heating the closed mold to a temperature that causes the at least two predetermined amounts of rubber pellets to spread from the discrete locations through the cavity within the closed molds, the cavity comprising at least one tab form extending from a shape defining a desired molded rubber object, the rubber pellets combining to form an intermediate rubber object having a shape desired for a molded rubber object and at least one tab; after a predetermined amount of time has elapsed, opening the mold by at least partially removing the mold top from the mold bottom; positioning a gripping device, for example a gripping device on the end of a positionable mechanical arm, over the tab of the intermediate rubber object while the intermediate rubber object remains in the mold bottom; gripping the tab of the intermediate rubber object with the gripping device; moving the gripping device and the gripped tab of the intermediate rubber object away from the mold bottom at a non-perpendicular angle to peel the intermediate rubber object from the mold bottom; and removing the tab from the intermediate rubber object to form a final molded rubber object.

The present invention is described above in examples only. Other configurations, equipment pieces, etc. may be employed without departing from the scope of the present invention. While the present invention is described particularly with regard to shoes and shoe components and, more particularly, with regard to rubber outsoles for shoes, other types of rubber parts may be formed using systems and methods in accordance with the present invention. While examples of the present invention are illustrated and described with a single tab per rubber object, multiple tabs may be formed in a single rubber object, to permit a rubber object to be de-molded in multiple steps (for example, to prevent damaging a delicate rubber object) or to provide alternatives should a particular rubber object resist de-molding using one tab.

The systems of the present invention may be controlled in accordance with methods of the present invention by way of one or more computing devices. Computing devices may be used in accordance with the present invention to execute computer readable code to cause the computer to control devices and systems, such as but not limited to those described herein, to perform the steps described herein. Computing devices may control systems and/or components in accordance with the present invention via connections, both wireless and wired, through network connections, etc. Computing devices and computer readable code retained in memory thereon or accessible thereby may be adaptable for different types of molded objects and/or different sizes or numbers of molded rubber objects. For example, a computing system executing computer readable code to perform methods in accordance with the present invention may cause different amounts of rubber pellets to be dispensed at different locations for different products, different sizes of products, etc. In this fashion, systems and methods in accordance with the present invention may readily process different sizes of shoe parts, different models of shoes, or even different products entirely.

Having thus described the invention, what is claimed is:

1. A system for forming molded rubber objects, the system comprising:
    a plurality of molding stations, each of the molding stations including a mold for molding a rubber object, each mold having a mold top and a mold bottom that together define a molding surface of a cavity that defines a size and shape of a molded rubber object and a tab form that defines a size and shape of a tab extending from the molded rubber object, the tab form located, at least in part, in the mold top, each mold capable of being in at least an open position that exposes at least a portion of the cavity and a closed position that encloses the cavity within the mold;
    a gripping device configured to access each of the plurality of molding stations and grip the tab formed with the molded rubber object after the mold has been moved to the open position, the gripping device exerting a force on the molded rubber object through the tab to remove the molded rubber object from the mold.

2. The system of claim 1 further comprising a dispenser that dispenses predetermined amounts of rubber pellets into the cavity of the mold at each of the molding stations, wherein the dispenser is positionable to dispense a first predetermined amount of pellets at a first location within the cavity and a second predetermined amount of pellets at a second location within the cavity.

3. The system of claim 2, wherein the dispenser dispenses the first predetermined amount of pellets and the second predetermined amount of pellets based upon weight.

4. The system of claim 1, wherein the system further comprises a trimming device that removes the tab from the molded rubber object after the molded rubber object is removed from the cavity.

5. The system of claim 4, wherein the mold provides the tab form such that the tab is integrally formed with and extending from flashing on an edge of the molded rubber object.

6. The system of claim 5, wherein the trimming device that removes the tab from the molded rubber object comprises a deflashing system that removes flashing from the molded rubber object while removing the tab.

7. A method for forming molded rubber objects, the method comprising:
    closing one mold of a plurality of molds by bringing a mold top together with the mold bottom to define a molding surface of a cavity and a tab form within the mold, the molding surface defining a size and shape of a molded rubber object, and the tab form defining a size and shape of a tab extending from the molded rubber object, the tab form located, at least in part, in the mold top;
    forming an intermediate rubber object by processing rubber pellets positioned within the cavity;
    subsequent to forming the intermediate rubber object, opening the mold by at least partially removing the mold top from the mold bottom;
    gripping the tab of the intermediate rubber object with a gripping device while the intermediate rubber object remains in the mold bottom;
    moving the gripping device and the tab of the intermediate rubber object away from the mold bottom to separate the intermediate rubber object from the mold bottom; and
    removing the tab from the intermediate rubber object to form a final molded rubber object.

8. The method of claim 7, further comprising removing flashing from the intermediate rubber object while removing the tab.

9. The method of claim 7, wherein the tab extends substantially perpendicular to the mold bottom.

10. A system for forming molded rubber objects, the system comprising:
    a plurality of heat press stations, each heat press station having a mold opening adapted to receive a mold and apply heat and pressure to the mold;
    each mold having a mold top and a mold bottom that together define a molding surface of a cavity that defines a size and shape of a molded rubber object and a tab form that defines a size and shape of a tab extending from the molded rubber object, the tab form located, at least in part, in the mold top, the mold capable of being in at least an open position that exposes at least a portion of the cavity and a closed position that encloses the cavity within the mold; and a gripping device configured to access each of the plurality of heat press stations, when accessing one of the heat press stations the gripping devices is configured to grip the tab formed in the molded rubber object after the mold has been moved to the open position, the gripping device exerting a force on the molded rubber object through the tab to remove the molded rubber object from the cavity.

11. The system of claim 10, wherein the tab extends from flashing attached to a perimeter of the molded rubber object.

12. The system of claim 10, wherein each heat press station has a heat source that heats the mold in the closed position to at least a temperature at which vulcanization of rubber pellets occurs.

13. The system of claim 10, wherein the gripping device is on an arm that can extend to access each of the plurality of heat press stations.

14. The system of claim 10, further comprising a dispenser that is configured to access each of the plurality of heat press stations and dispense at least one predetermined amount of rubber pellets into the cavity when the mold is in the open position, wherein the dispenser comprises at least two cups, which are pre-filled with the at least one predetermined amount of rubber pellets, that dispense the rubber pellets into the cavity.

15. The system of claim 14, wherein a first of the at least two cups dispenses the rubber pellets at first location within the cavity and a second of the at least two cups dispenses the rubber pellets at a second location within a second independent portion of the cavity that is different from the first location.

16. The system of claim 14, further comprising an X-Y table that positions the dispenser.

17. The system of claim 16, wherein the dispenser dispenses a first predetermined amount of rubber pellets into the cavity at a first location and dispenses a second predetermined amount of rubber pellets into the cavity at a second location, the first location is different from the second location and the first predetermined amount is different from the second predetermined amount.

18. The system of claim 17, further comprising a deflashing station for removal of flash and the tab from the molded rubber object.

19. The system of claim 10, wherein the molding surface defines a perimeter of the molded rubber object and the tab extends beyond the perimeter.

20. The system of claim 10, wherein the tab form extends from a junction of the mold top and the mold bottom.

* * * * *